United States Patent [19]

Tanguay, Jr. et al.

[11] Patent Number: 5,568,574
[45] Date of Patent: Oct. 22, 1996

[54] MODULATOR-BASED PHOTONIC CHIP-TO-CHIP INTERCONNECTIONS FOR DENSE THREE-DIMENSIONAL MULTICHIP MODULE INTEGRATION

[75] Inventors: Armand R. Tanguay, Jr., Fullerton; B. Keith Jenkins, Long Beach, both of Calif.

[73] Assignee: University of Southern California, Los Angeles, Calif.

[21] Appl. No.: 489,983

[22] Filed: Jun. 12, 1995

[51] Int. Cl.$^6$ .............................. G02B 6/12; G03H 1/00
[52] U.S. Cl. .................... 385/14; 385/1; 385/4; 385/10; 385/15; 385/24; 385/33; 385/37; 385/131; 359/15; 359/34
[58] Field of Search .................... 385/1, 2, 4, 8, 385/10, 14, 15, 16, 17, 18, 24, 27, 28, 31, 37, 47, 49, 129, 130, 131, 132; 359/10, 15, 34

[56] References Cited

U.S. PATENT DOCUMENTS

| | | | |
|---|---|---|---|
| 4,776,661 | 10/1988 | Handa | 385/37 X |
| 5,061,027 | 10/1991 | Richard | 385/14 |
| 5,101,460 | 3/1992 | Richard | 385/37 |
| 5,164,930 | 11/1992 | Sugiura | 369/44.12 |
| 5,193,130 | 3/1993 | Nishiwaki et al. | 385/14 |

(List continued on next page.)

OTHER PUBLICATIONS

R. F. Carlson et al, "Future Manufacturing Techniques for Stacked MCM Interconnections", Journal of Manufacturing, pp. 51–55 (Jun. 1994).
P. Cinato et al, "Optical interconnections within multichip modules", Optical Engineering, vol. 32, No. 4, pp. 852–860 (Apr. 1993).
S. Tang et al, "1-to-42 optoelectronic interconnection for intra–multichip–module clock signal distribution", Applied Physics Letters, vol. 64, No. 22, pp. 2931–2933 (30 May 1994).

(List continued on next page.)

*Primary Examiner*—Brian Healy
*Attorney, Agent, or Firm*—Benman Collins & Sawyer

[57] ABSTRACT

Computation-intensive applications such as sensor signal processing, sensor fusion, image processing, feature identification, pattern recognition, and early vision place stringent requirements on the computational capacity, size, weight, and power dissipation of modular computational systems intended for both embedded and high performance computer environments. Such ultra high speed, ultra high density computational modules will typically be configured with multiple processor, memory, dedicated sensor, and digital signal processing chips in close-packed multichip modules. The present invention relates to a novel architecture and associated apparatus for the development of highly multiplexed photonic interconnections between pairs of such electronic chips incorporated in vertical stacks within three-dimensional multichip module configurations. Vertical signal transmission through the chip substrates is accomplished by using a planar-waveguide-based optical power bus to provide a parallel array of beams to read out a modulator array that is flip-chip bonded to each silicon substrate. Local and quasi-local connectivity in the vertical dimension is accomplished by using diffractive optical structures that provide for both point-to-point interconnections and weighted fan-out within a local neighborhood. Global connectivity is incorporated by means of computer-generated volume holographic optical elements that are fabricated as a multilayer diffractive optical element. Several different architectural implementations of such computational modules are provided to address applications that include high-bandwidth two-dimensional displays, multilayer neural networks, image processors, multiple processors with access to shared memory, and rending engines for computer animation and graphics. In addition, subsystems of the computational-module architecture and apparatus are described that provide for compact optical readout of modulator-based flat panel displays.

19 Claims, 15 Drawing Sheets

U.S. PATENT DOCUMENTS

| | | | |
|---|---|---|---|
| 5,200,631 | 4/1993 | Austin et al. | 257/81 |
| 5,237,434 | 8/1993 | Feldman et al. | 359/19 |
| 5,266,794 | 11/1993 | Olbright et al. | 250/214 LS |
| 5,268,985 | 12/1993 | Ando et al. | 385/129 |
| 5,276,748 | 1/1994 | Magel | 385/37 |
| 5,295,208 | 3/1994 | Caulfield et al. | 385/27 |
| 5,410,622 | 4/1995 | Okada et al. | 385/14 |
| 5,412,743 | 5/1995 | Brazas, Jr. | 385/2 |
| 5,419,762 | 2/1996 | Deacon et al. | 385/16 |

OTHER PUBLICATIONS

S. Koh et al, "Synchronous global clock distribution on multichip modules using optical waveguides", Optical Engineering, vol. 33, No. 5, pp. 1587–1595 (May 1994).

W. B. Veldkamp, "Wireless Focal Planes 'On the Road to Amacronic Sensors'", IEEE Journal of Quantum Electronics, vol. 29, No. 2, pp. 801–813 (Feb. 1993).

W. B. Veldkamp et al, "Binary Optics", Scientific American, pp. 92–97 (May 1992).

G. L. Swanson et al, "Diffractive optical elements for use in infrared systems", Optical Engineering, vol. 28, No. 6, pp. 605–608 (Jun. 1989).

T. Kubota et al, "Array illuminator using grating couplers", Optics Letters, vol. 14, No. 12, pp. 651–652 (Jun. 15, 1989).

M. Takeda et al, "Integrated optic array illuminator: a design for efficient and uniform power distribution", Applied Optics, vol. 30, No. 9, pp. 1090–1095 (20 Mar. 1991).

a. D. Norte et al, "Multiple–Layer Optical Interconnections Using Through–Wafer Hollow–Dielectric–Waveguide Vias", IEEE Photonics Technology Letters, vol. 6, No. 7, pp. 851–854 (Jul. 1994).

MODULATOR-BASED PHOTONIC CHIP-TO-CHIP INTERCONNECTIONS FOR DENSE THREE-DIMENSIONAL MULTICHIP MODULE INTEGRATION

TECHNICAL FIELD

The present invention is related generally to photonic interconnections and multichip module integration, and, more particularly, to the parallel interconnection of vertically-stacked integrated electronic chips within a three-dimensional multichip module, parallel readout of optical modulator arrays, integrated optical devices, gradient-index optical elements, microlens arrays, diffractive optical elements, and volume holographic optical elements.

BACKGROUND ART

A wide variety of potential applications exist for extremely compact, ultra high capacity computational modules in both embedded and high performance computer environments. These applications include among others sensor signal processing, sensor fusion, image processing, feature identification, pattern recognition, smart cameras, artificial multilayer retinas, early vision systems, neural networks, multiprocessor access to shared memories, parallel-access 3-D memory, highly parallel rendering engines for computer animation and graphics, high resolution two-dimensional and three-dimensional display drivers, and high bandwidth image displays. All of these applications are computation intensive, and in many cases must be accomplished in operational environments that are restricted both in available power and in the space allowed for computational elements.

In order to handle these and other related "grand challenge" problems, advanced computational systems must employ distributed parallel processing elements in an architecture that is amenable to the compact integration of multiple processor and memory chips, operates at low power, and supports high-bandwidth parallel input/output (I/O). Parallel processing can be accommodated both by a multiplicity of single-chip processing elements as well as by the incorporation of parallel processing on each chip. Certain applications (such as parallel multiprocessors, 1-D sensor signal processing, and 1-D sensor fusion) may ultimately require only a few complex processors per chip, while other applications (such as image processing, 2-D sensor signal processing, and early vision) segment more readily into many simple processors (e.g., smart pixels) on each chip. The integration of both fine-grained and coarse-grained processing elements within a computational multichip module requires advanced packaging concepts that increase manufacturability and enable enhanced chip-to-chip interconnection capacity, thereby augmenting the aggregate computational performance of the resultant Processor/interconnection system. The requisite features of such an advanced packaging architecture and its associated packaging technology include the capacity for parallel transmission of intermediate computational results, and the availability of dense local and global interconnections.

Electronic multichip module integration techniques have been previously employed in an attempt to provide these requisite features. Two separate approaches are well-known to those skilled in the art, including (1) the horizontal integration of electronic chips on a common substrate that contains electrical chip-to-chip interconnections, and (2) the vertical integration of electronic chips in a three-dimensional (3-D) stack.

The advantages of horizontal multichip module integration include ease of chip placement and rework, mature wire-bonding and tape-automated bonding (TAB) techniques for electrical interconnection of each individual chip to the substrate, and capability for planar heat removal and thermal management techniques. However, although horizontal multichip module integration has been successfully applied to a wide range of applications, this integration scheme exhibits relatively low I/O bandwidths and high power dissipation, due primarily to long off-chip lead lengths with associated high capacitance.

The advantages of vertical multichip module integration include increased I/O bandwidth and reduced power dissipation, due primarily to shortening of off-chip lead lengths. However, the integration of more than two chips in the vertical dimension by means of electrical interconnections only requires either the routing of all I/O signals to the edge of each chip for interconnection by means of an edge-mounted electrical interconnection network, or the incorporation of vertical electrical vias through each chip. The former (edge-mounted interconnection) approach has shown promise for multichip memory and certain sensor applications in which the memory or processor architectures lead naturally to I/O ports arranged along the individual chip edges. In other highly-parallel computation-intensive applications such as those envisioned herein, the routing of all I/O ports to the chip edges proves to be either impractical, limiting in terms of overall I/O signal capacity, or expensive in terms of the additional chip area that must be incorporated to allow for multiple interconnection routing on the chip and multiplexing and demultiplexing of each I/O port. The latter (vertical electrical via) approach has been intensively investigated for many years, but to date has not proven to be commercially viable.

Given the current limitations of electronic multichip module integration as applied to the computational and display tasks outlined above, several investigators have proposed the interconnection of multiple electronic processors with both optical I/O and electronic I/O, with optical I/O employed for dense parallel chip-to-chip interconnections, and electronic I/O used for lateral control signal and local cache memory access as appropriate. Two primary approaches have been investigated thus far, including (1) the use of free-space optical interconnection techniques, and (2) the incorporation of proximity-coupled photonic sources (such as light-emitting diodes or vertical-cavity surface-emitting-lasers) and associated detectors to provide compact optical-interconnection channels. Free-space optical interconnections provide increased aggregate signal bandwidth and capacity for both local and global interconnectivity, but also require relatively immature bulk-optical packaging technologies and large system volumes. The incorporation of proximity-coupled photonic sources and detectors to provide for plane-to-plane interconnections can significantly reduce the required system volume, but at the current state-of-the-art carry high power dissipation penalties at the desired interconnection bandwidths. As a consequence of high power dissipation, such approaches are delimited in aggregate interconnection capacity as expressed by the product of the number of interconnection channels per unit area and the bandwidth of each interconnection channel. Furthermore, although electronic I/O and its associated packaging issues are well understood and highly developed at this point, packaging techniques that incorporate optical interconnections have not yet achieved technological break-even.

It is to these ends of producing a manufacturable electronic/photonic packaging technology for dense high-bandwidth interconnection of sets of processing elements, microprocessors, and memory modules or arrays distributed over multiple chips with increased chip-to-chip interconnection density and aggregate interconnection bandwidth, as well as reduced power consumption, that the invention described herein is directed.

DISCLOSURE OF INVENTION

In accordance with the invention, three-dimensional multichip modules with dense photonic chip-to-chip interconnections are provided. As a part of the invention, a modulator array with compact parallel optical readout comprises:

(a) an array of optical modulators;

(b) an optical power bus means for optical readout of the array of optical modulators, located in close physical proximity to the array of optical modulators, optical power bus means comprising:

(i) one or more optical waveguides on a surface of a substrate, said surface defining a plane; and (ii) means for coupling light out of the optical waveguide(s) into one or more outcoupled beams, said outcoupled beams propagating at a nonzero angle with respect to the plane defined by the substrate surface; and (c) optics means for directing the outcoupled beam(s) towards one or more optical modulators of the array of optical modulators, generating a set of modulator readout beams.

The optical modulators may operate in reflection or transmission, or the array of optical modulators may include both reflection and transmission modulators. Means for coupling light out of the optical waveguide(s) can include diffraction, reflection, refraction, scattering, or evanescent wave coupling. Means for directing the outcoupled beam(s) towards the optical modulators can include beam propagation, a microlens array, a diffractive optical element array, optical scattering, or evanescent wave coupling.

Further in accordance with the invention, combinations are provided comprising the above apparatus together with an array of diffractive optical elements, array of microlenses, array of optical detectors, array of optical fibers, a silicon electronic chip, and/or a volume holographic optical element. Combining these with an additional modulator array with compact parallel optical readout provides a module that can be used to build up larger systems, as provided by the invention.

In accordance with the invention, such a larger system can be built from modules that each comprise: an array of reflective modulators with compact parallel optical readout; an optical interconnection element, comprising an array of diffractive optical elements, an array of microlenses, and/or a volume holographic optical element, in close physical proximity to the optical power bus; and a detector array in physical proximity to the optical interconnection element. Combining this module with a silicon electronic chip, flip-chip bonded to the modulator array, yields a complete photonic module. This photonic module can be cascaded with any number of similar photonic modules, in order to provide a superstructure that is a larger and more computationally powerful photonic multichip module, as provided by the invention. A variant of this multichip module utilizes monolithic integration of electronics, detectors, and modulators on a single substrate.

Further in accordance with the invention, a preferred embodiment of a photonically interconnected multichip module is provided, and incorporates a silicon electronic chip, flip-chip bonded to a gallium arsenide modulator chip, in turn bonded to a microlens array, in turn bonded to an optical power bus (which can be fabricated in LiNbO$_3$ or in GaAs), in turn bonded to an optical interconnection element comprising an array of diffractive optical elements, in turn bonded to another silicon electronic chip incorporating integrated electronics and detectors.

In addition, a more compact preferred embodiment is provided by the invention and incorporates integrated electronics and detectors onto a first silicon substrate, a modulator array and optical power bus on opposite sides of a gallium arsenide substrate; a diffractive optical element array and an optional gradient index microlens array on one side of a second silicon substrate; and integrated detectors and electronics on the other side of the second silicon substrate. Further in accordance with the invention, a computer-generated stratified volume holographic optical element can be incorporated for global interconnections between modulator arrays and detector arrays.

The structure and apparatus of the invention significantly increase the aggregate bandwidth, defined by the product of the number of interconnections and the bandwidth of each interconnection, that can be achieved between integrated electronic chips, as compared to prior art in multichip module integration technology. It also potentially decreases physical system thickness and cost of solid-state display systems for certain applications.

Other objects, features, and advantages of the present invention will become apparent upon consideration of the following detailed description and accompanying drawings, in which like reference designations represent like features throughout the FIGURES.

BEST MODES FOR CARRYING OUT THE INVENTION

Figure 1:
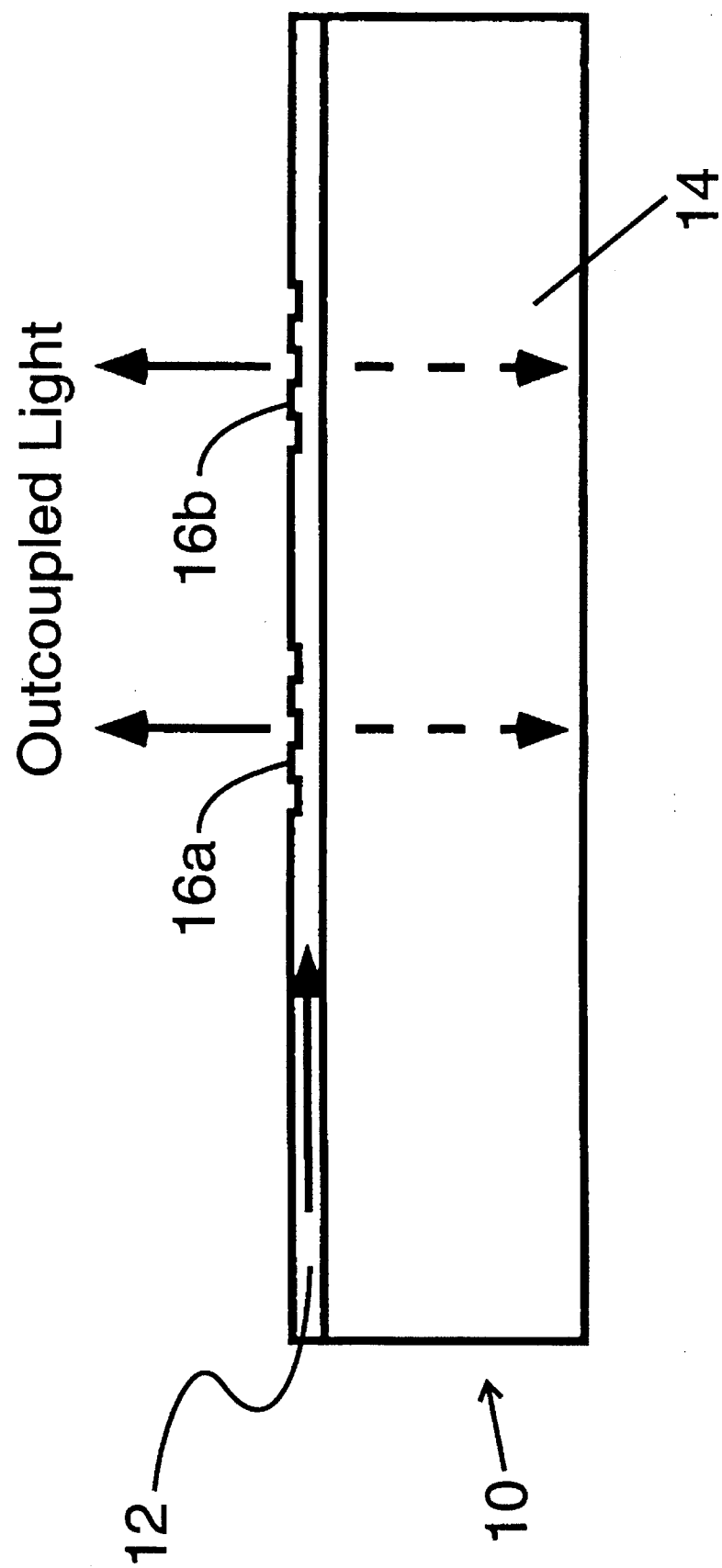
FIG. 1 is an optical power bus, showing redirection or coupling of light out of the waveguide into the vertical dimension (thereby forming a nonzero angle with respect to the plane defined by the face of the substrate) by means of an array of outcoupling gratings.

Reference is now made in detail to specific embodiments of the present invention, which illustrate the best modes presently contemplated by the inventors for practicing the invention. Alternative embodiments are also briefly described as applicable.

A. GENERAL

1. Introduction

The description that follows is directed primarily to an electronic/photonic interconnection technology that can be directly applied to sensor signal processing, image processing, and vision. However, it will be appreciated by those skilled in the art that the architecture and apparatus is generic in whole or in part to a number of technologies, including the ultra-dense, ultra-high-capacity computational environment, parallel processing systems (with distributed memory and/or access to shared memory), multidimensional displays and display drivers, computer animation and graphics, and telecommunications.

The preferred embodiment of the invention comprises densely-interconnected multilayer hybrid photonic/electronic modules in which each active electronic layer is composed of a silicon processor chip (with integrated detectors) that is flip-chip bonded to a compound semiconductor chip configured with an array of multiple quantum well modulators. Interconnections between active layers are provided by either planar or volume diffractive optical elements that are proximity-coupled to the active layers in order to form rugged 3-D computational blocks.

At the outset, it will be obvious to those skilled in the art that strikingly different requirements are imposed by the necessity for local, quasi-local, and global interconnectivity among distributed processing elements. In accordance with the teachings of the invention, therefore, quasi-planar diffractive optical elements are employed for local and quasi-local interconnections in the third (out-of-plane) dimension, and computer-generated volume diffractive optical elements are employed for global interconnections.

For local and quasi-local interconnections, an operational capacity of $10^4$ pin-outs per cm$^2$ can be expected in certain cases, with an interconnection density of $10^6$ per cm$^2$ (assuming a fan-out of 100 per pin-out and a fan-in of 100 per pin-in), operating at an effective aggregate bandwidth of 10 Tb/s per chip pair and 100 Tb/s per cm$^3$. For global interconnections, interconnection densities of $10^8$ to $10^{10}$ per cm$^3$ can be projected, operating at an aggregate bandwidth in excess of $10^3$ to $10^5$ Tb/s (for fully-interconnected fan-out and fan-in). These projected performance figures are far in excess of comparable specifications for any currently investigated alternative electronic-only interconnection technology.

The key features of the electronic/photonic multichip module integration technology that comprise the teachings of the invention are projected to yield revolutionary advances in the state of the art of densely-interconnected computational modules. These key features include: (1) the integration of silicon-based multichip modules with parallel interconnections in the vertical dimension that are capable of a high degree of fan-in and fan-out, without the need for through-substrate vias; (2) the hybrid integration of silicon-based processing electronics with inverted cavity compound semiconductor multiple quantum well modulators by flip-chip bonding to provide for efficient parallel optical communication channels, again without resort to a via technology; (3) the proximity-coupling and dense 3-D interconnection of multiple hybrid silicon/GaAs computational elements by means of planar diffractive optical elements; (4) the use of an optical power bus to provide for highly compact readout of reflection mode optical modulator arrays in the third (vertical) dimension; (5) the global interconnection of multiple hybrid silicon/compound semiconductor computational elements by means of volume holographic optical elements; and (6) the incorporation of gradient index (GRIN) technology, multilayer coatings, and multiple thin film layers with different refractive indices into the fabrication of diffractive optical elements to gain design flexibility and performance enhancements.

These key features together allow for the three-dimensional integration of densely-interconnected analog and digital processors, and as a result for the implementation of a rich computational fabric in compact, low power modules. In the following sections, we describe the key features of the invention, and provide descriptions of specific applications of the teachings of the invention to sensor signal processing, image processing, vision, ultra-dense and ultra-high-capacity computational modules, parallel processing systems (with distributed memory and/or access to shared memory), multidimensional displays and display drivers, computer animation and graphics, and telecommunications.

2. Optical Power Bus

At the outset, it is of considerable importance to note that a key limitation of the prior art of electronic/photonic interconnections is the high power dissipation characteristic of current-generation light emitting diodes and vertical-cavity surface-emitting-laser arrays, which in turn places strict limitations on the density of parallel interconnections and the aggregate bandwidth that can be accommodated in a multichip module. High bandwidth optical modulators, however, offer significantly reduced power dissipation, and hence allow for a significantly increased density of multichip module parallel interconnections and associated aggregate bandwidth. A principal teaching of the present invention is the use of a novel optical power bus, as described below, to provide for compact parallel readout of high-bandwidth modulator arrays within a multichip module, thereby enabling the incorporation of such modulator arrays at high density in a compact multilayer structure that obviates the need for free-space optical components (such as beam-forming optics or a polarizing beamsplitter) to read out the modulator array.

Referring now to the drawings, wherein like numerals designate like elements throughout, FIG. 1 depicts an integrated optical element that is configured in such a manner as to deliver an array of independent readout beams to a corresponding modulator array. It will be appreciated by those skilled in the art that this component serves the function of a bus for the distribution of optical power (an optical power bus), in direct analogy to both an electronic power bus, on the one hand, and an optical beamsplitter, on the other.

In one possible implementation, the optical power bus 10 comprises an integrated optical waveguide 12, fabricated on one surface of an optically-polished substrate 14. The integrated optical waveguide is segmented into an array of parallel rib or channel waveguides by means of photolithographically-defined chemical or dry etching (reactive ion etching, ion beam milling, or reactive ion beam etching). Each such rib or channel waveguide is further modified by a one-dimensional array of photolithographically-defined and etched outcoupling gratings 16a and 16b that serve to direct light out of the waveguide into the third (vertical) dimension. The angle of the outcoupled beam with respect to the substrate surface is controllable by suitable design of the outcoupling grating. Such redirection of the outcoupled beams by means of diffraction is analogous to the general function of serial-to-parallel conversion, or to the general function of a tapped signal line. The effect of the aggregate array of outcoupling gratings is to provide both an optical beamsplitter function and an optical spot array generator function in a compact, planar geometry.

In a second possible implementation, the optical power bus again comprises an integrated optical waveguide, but in this instance the waveguide is not segmented as in the above implementation. Rather, the waveguide is modified to incorporate a space-variant holographic grating that may be either optically recorded in a photosensitive material, subsequently chemically or dry etched, or photolithographically-defined by means of a computer-generated mask. The space-variant holographic grating is designed to provide for local vertical outcoupling in a pre-determined array pattern, thus providing a function that is largely equivalent to that of the first optical power bus implementation described above.

It will be easily appreciated by those skilled in the art that such space-variant holographic gratings may incorporate any combination of amplitude and phase modulation, and additionally can be designed to incorporate either positive or negative focal power. In addition, the outcoupling efficiency of any given outcoupling grating or specific location in the space-variant holographic grating can be controlled by means of the local modulation depth of the grating. In all such cases, the design process must take into account the optical path of the light from the semiconductor diode laser source to the specific outcoupling location of interest, as other outcoupling gratings distributed along the optical path will extract some fraction of the incident illumination prior to its impingement on the outcoupling grating of interest. The net effect of all such preceding outcoupling gratings can be modeled as a simple reduction in the illumination intensity for all following outcoupling gratings, provided that the outcoupling efficiencies are designed to be low enough to preclude significant nonlinear feedback effects among the set of distributed gratings.

Figure 2:
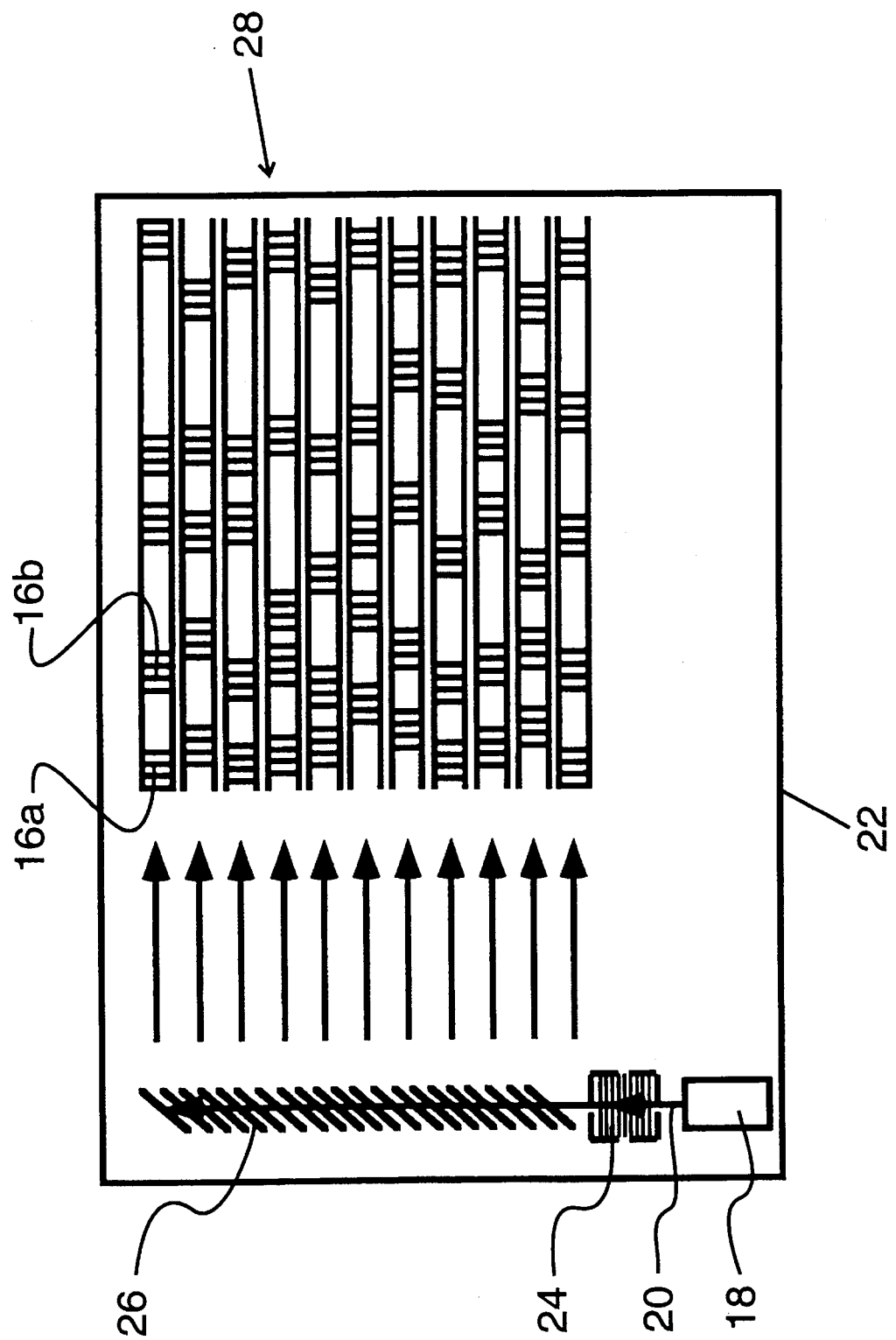
FIG. 2 is an optical power bus, showing the distribution of light from a semiconductor diode laser to the array of outcoupling gratings.

FIG. 2 depicts one of several possible configurations by which a single semiconductor diode laser can be used to illuminate the entire array of outcoupling gratings, thereby providing a parallel array of outcoupled beams that emit in the vertical dimension. The semiconductor diode laser 18 is supported on a wedged mount such that its output beam 20 is angled toward the substrate 22, thereby impinging on a holographic incoupling grating 24 and thus coupling into the planar waveguide structure. Incorporation of a corner-turning diffraction grating 26 allows for redirection of the single propagating beam into either an array of rib or channel waveguides 28 (as in the first optical power bus implementation described above), or into a spatially-broadened beam that illuminates the space-variant outcoupling grating (as in the second optical power bus implementation described above). Alternatively, the semiconductor diode laser may be butt-coupled to the waveguide and aligned in order to maximize the incoupling efficiency, which obviates the need for the holographic incoupling grating.

Additionally, it will be readily appreciated by those skilled in the art that optical power can be provided to the module by employing a linear array of edge-emitting or vertical-cavity surface-emitting lasers that are butt-coupled to the waveguide, with emitted light propagating toward the array of rib waveguides (or, alternatively, toward the space-variant holographic grating). This configuration allows for a potential significant increase in the total amount of optical power supplied to the transmissive or reflective modulator arrays, and eliminates the need for a corner-turning diffraction grating.

3. Parallel Readout of Modulator Array

Figure 3:
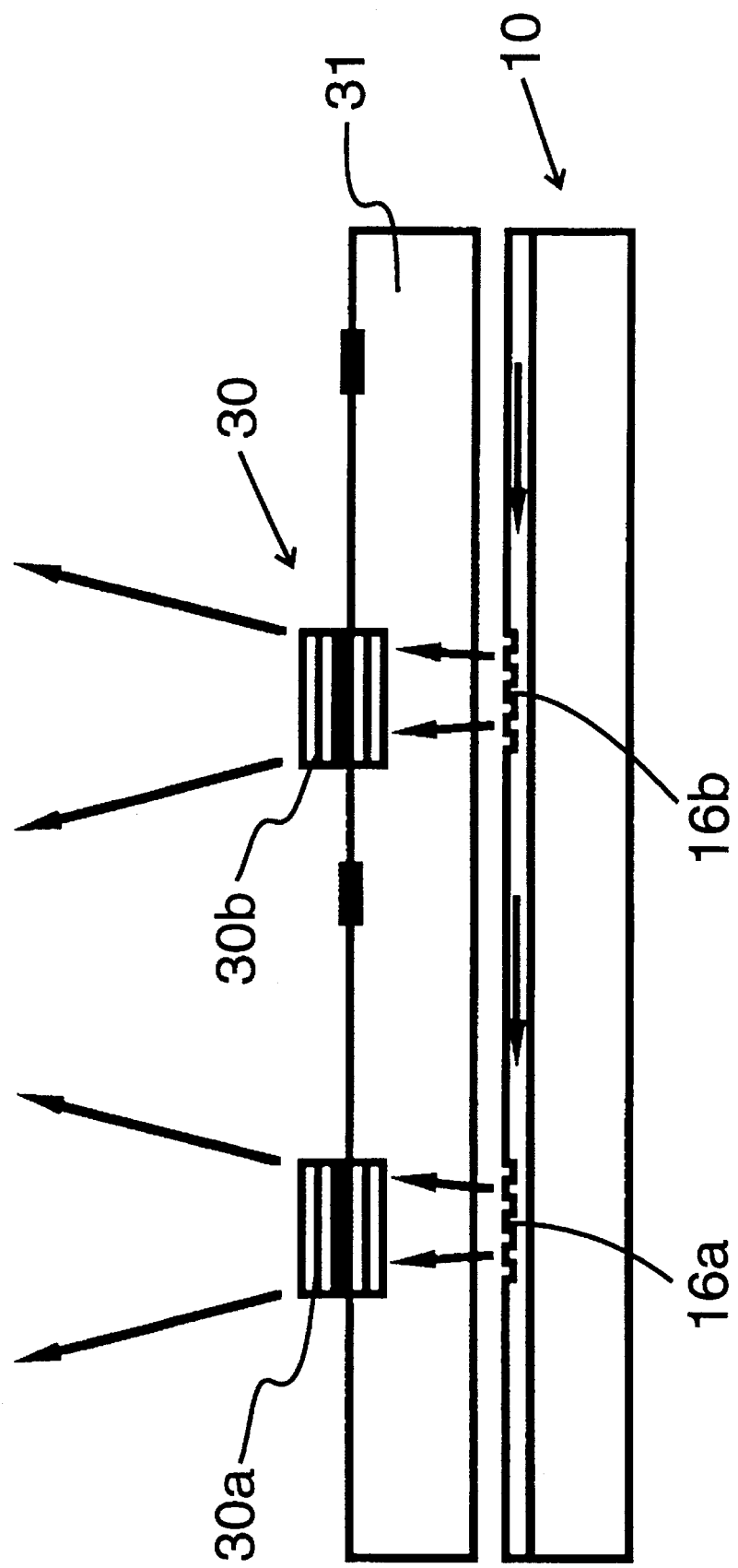
FIG. 3 is a schematic diagram of an array of optical transmissive modulators on a GaAs substrate, with compact parallel optical readout provided by an optical power bus, wherein optics means for directing the outcoupled beams from the gratings to the modulators consists of through-substrate propagation.

The novel optical power bus described above is an essential element of the invention, in that it provides the key capability for parallel illumination of a reflective or transmissive modulator array in a highly compact geometry. This capability is illustrated in FIG. 3, which depicts a schematic diagram of the optical power bus 10 proximity-coupled to a transmissive modulator array 30. In practice, it will be appreciated by those skilled in the art that the optical power bus will optimally be bonded to the transmissive modulator array substrate 31. Preferred means for such substrate-to-substrate bonding include the use of die-attach epoxy, optical cement, or flip-chip bonding techniques. As can also be inferred from FIG. 2, the distribution of outcoupling gratings is assumed to be arranged in such a manner as to match the distribution of individual modulator elements, such that each individual outcoupling grating (16a, 16b) can be aligned with its associated modulator element (30a, 30b, respectively) as shown in FIG. 3.

In operation, light incoupled to the optical waveguide from the semiconductor diode laser is outcoupled from each individual outcoupling grating, and is thereby directed through the associated transmissive modulator element. The transparency of each modulator element, and hence the degree of optical throughput, is controlled either by electronic means incorporated directly on the modulator array substrate, or by external electronic means as defined below. In this manner, each individual combination of an outcoupling grating and its associated modulator element perform the function of a modulatable source in an optical link, thereby providing the requisite source for a single photonic interconnection. It will be easily appreciated by those skilled in the art that the array of such pairs of outcoupling gratings on the optical power bus and associated modulator elements within the transmissive modulator array form the basis of a dense, parallel, photonic interconnection in the vertical (out-of-plane) dimension.

In addition, such an apparatus, if fabricated out of substrate materials and modulating mechanisms appropriate to visible light, can function as a back-lit panel display in a physically thin structure.

Figure 4:
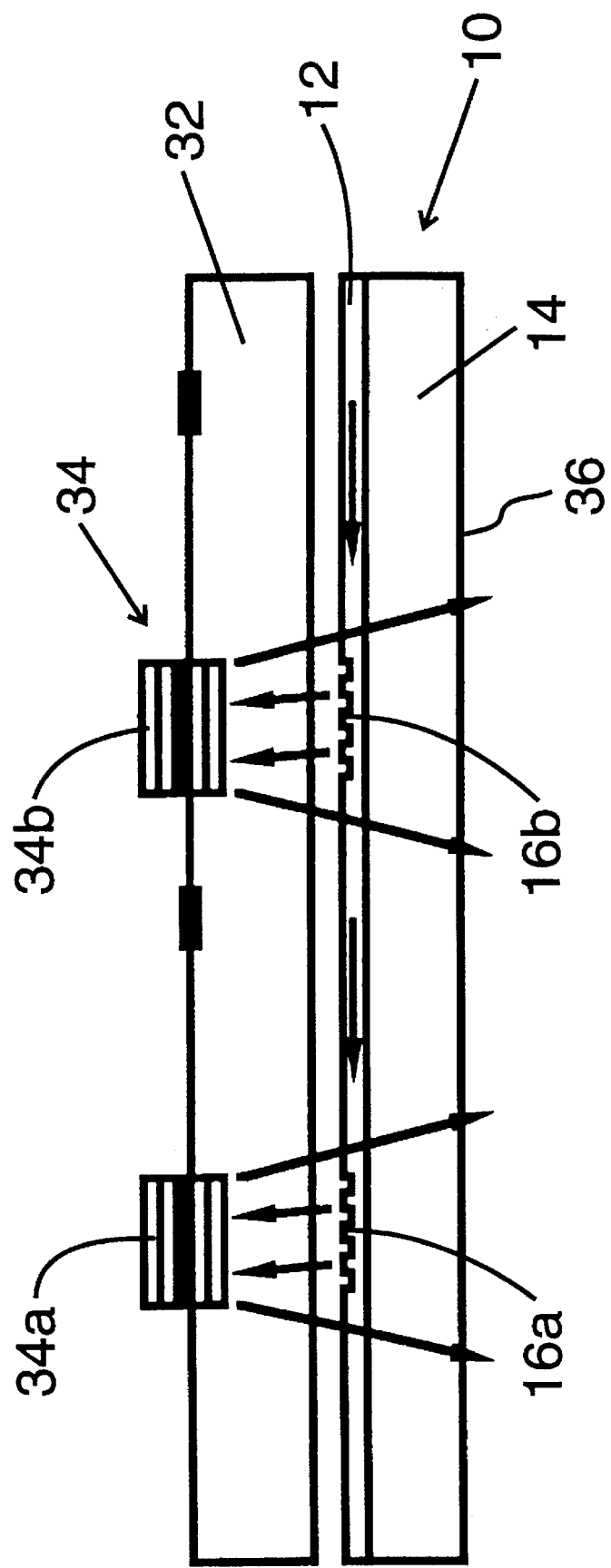
FIG. 4 is a schematic diagram of an array of optical reflective modulators on a GaAs substrate, with compact parallel optical readout provided by an optical power bus, wherein optics means for directing the outcoupled beams from the gratings to the modulators consists of through-substrate propagation, and the beams reflected by the modulators pass back through the optical power bus.

FIG. 4 depicts a schematic diagram of the optical power bus 10 proximity-coupled to a reflective modulator array 34. In this case, the light incoupled to the optical waveguide from the semiconductor diode laser is again outcoupled from each individual outcoupling grating (16a, 16b), and is thereby directed toward the associated reflective modulator element (34a, 34b, respectively). The reflectivity of each reflective modulator element is controlled as above either by electronic means incorporated directly on the reflective modulator array substrate, or by external electronic means as defined below. Light reflected from each reflective modulator element is redirected through the outcoupling grating on the optical power bus, and is emitted from the back side 36 of the optical power bus substrate 14.

As described above, the outcoupling efficiency of each individual outcoupling grating is typically designed to be low enough to accommodate a large number of such gratings along the optical path from the semiconductor diode laser source without nonlinear feedback effects, thereby providing for a dense parallel interconnection capability. As is well-known to those skilled in the art, the incoupling efficiency of a given grating is equal to the outcoupling efficiency of the same grating under like conditions. As such, the fraction of light reflected from the reflective modulator element that is incoupled into the optical waveguide on the optical power bus is insignificant. Therefore, the optical power bus allows for parallel readout of an array of reflective modulator elements in a highly compact geometry.

Such a parallel reflective readout has application in dense, parallel, photonic interconnections in the vertical (out-of-plane) dimension. In addition, such an apparatus, if fabricated out of substrate materials and modulating mechanisms appropriate to visible light, can function as a reflective panel display with a thin transparent element on the front surface providing front lighting to the display in a physically thin structure.

The transparency of each transmissive modulator element (30a, 30b) as well as the reflectivity of each reflective modulator element (34a, 34b), and hence the degree of optical throughput, may be controlled either by electronic means incorporated directly on the modulator array substrate, or by external electronic means. The former method corresponds to the case of monolithic device integration, in which the electronic drive circuitry associated with each modulator element is incorporated on the same substrate as the modulator elements themselves, both fabricated in a process-compatible manner. The latter method corresponds to the case of hybrid device integration, in which the electronic drive circuitry associated with each modulator element is incorporated on a substrate separate from that of the modulator elements themselves.

Figure 5:
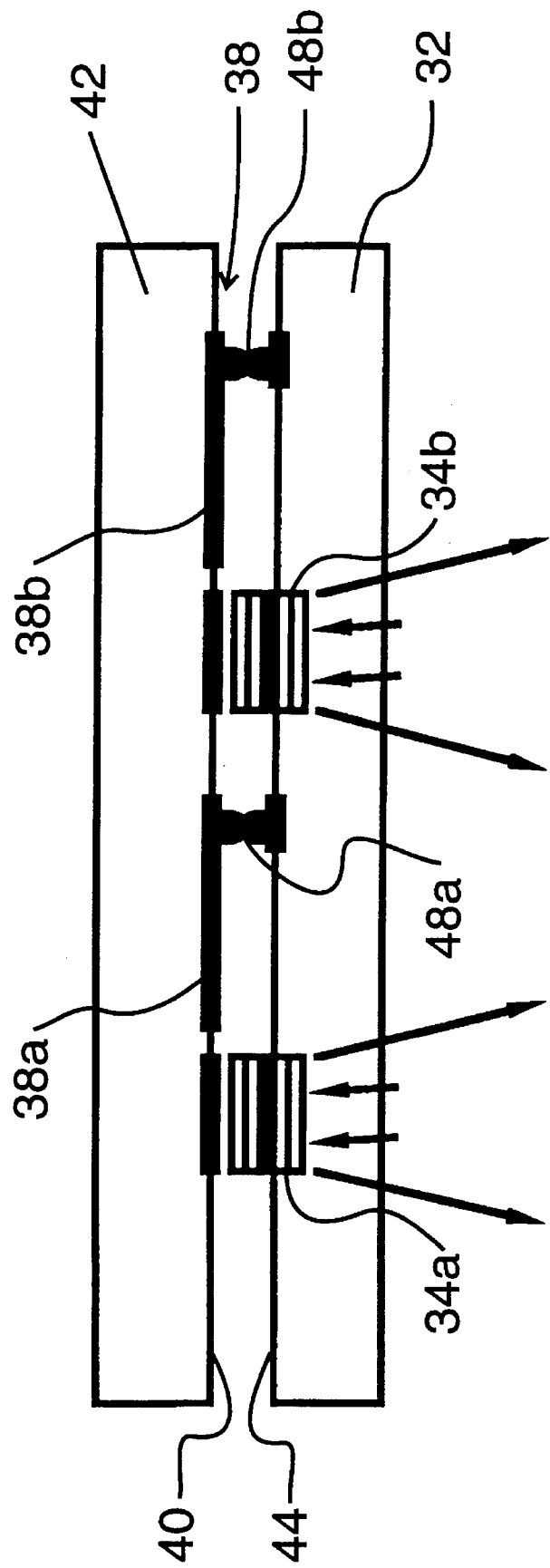
FIG. 5 is a schematic diagram of a hybrid electronic/photonic reflective modulator array, showing a silicon electronic chip flip-chip bonded to a GaAs modulator array chip.

An example of this latter method is depicted in FIG. 5, in which an array of electronic drive circuitry (in conjunction with associated microprocessors, memory, digital signal processing, and analog signal processing circuitry, as described in more detail below) (38a and 38b) is incorporated on the lower face 40 of the upper substrate, which is the electronic chip substrate 42, while a corresponding array of reflective modulators (34a and 34b) is incorporated on the upper face 44 of the lower substrate, which is the reflective modulator array substrate 32. Electrical connections 48a and 48b across the gap between the two substrates are provided by flip-chip bonding techniques, in which typically metallic bumps are deposited on both substrates prior to subsequent alignment and bonding by the application of either pressure, or temperature, or both to produce an essentially ohmic contact with low series resistance. Alternatively, anisotropic polymers may be employed for the across-gap electrical interconnection function, in which case the polymeric electrical conductivity is high in the vertical (interconnection) dimension, and low in the horizontal (transverse) dimension to provide for both patterned connections and lateral signal isolation.

Figure 6:
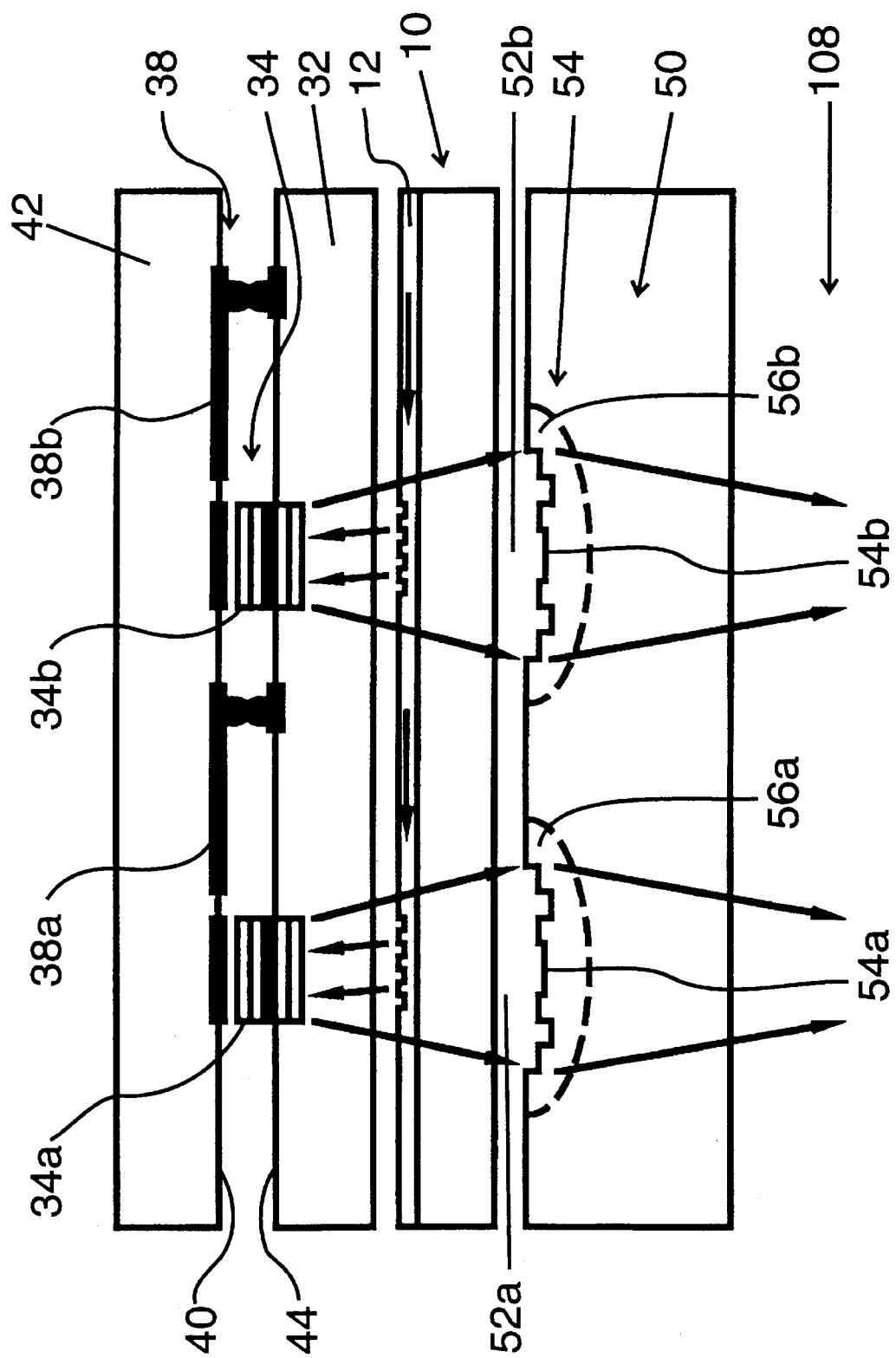
FIG. 6 is a schematic diagram of a photonic module that is a hybrid electronic/photonic computational/interconnection element, showing an optical power bus and an array of diffractive optical elements, without fanout of beams from each diffractive optical element.

As will be readily apparent to those skilled in the art, light reflected from a reflective modulator element, even if incident in a nearly collimated beam, will typically diffract as shown in FIG. 5 to form an expanding beam. FIG. 6 depicts a schematic diagram of a multilayer hybrid electronic/photonic computational/interconnection element, including an optical means 50 for intercepting each diffracting beam (52a and 52b) with an individual optical element that may in some applications provide focal power sufficient to focus the reflected beam, in some applications provide a variable beamsplitting and beam-directing function (fan-out), and in some applications provide both of these functions. FIG. 6 specifically depicts one of several possible methods for accomplishing the focusing function without beam fan-out, in which the optical means comprises an array of diffractive optical elements 54a and 54b that are specifically designed to provide appropriate focal power given the particular geometric parameters characteristic of the modulator array 34 (thickness and refractive index of the substrate, size and shape of the reflective modulator elements), the optical power bus 10 (outcoupling grating or space-variant holographic grating size, shape, and period; thickness and refractive index of the substrate), and the diffractive optical element array 54 (thickness and refractive index of the substrate), and of the desired beam-forming (focusing) function, as well as the presence or absence of any incorporated antireflection coatings. Because each beam incident on a diffractive optical element is diffracted from an associated modulator, each diffractive optical element is operatively associated with (at least) one such modulator.

Again in reference to FIG. 6, provision is made to incorporate a gradient-index (GRIN) refractive element (56a and 56b) collocated with each diffractive optical element (54a and 54b, respectively), which is known to those skilled in the art to provide additional design flexibility (particularly with regard to aberration-correction and increased focal power) in the case of bulk optical components. In certain of the applications discussed below, the incorporation of a GRIN element can be expected to significantly relieve the design constraints on the associated diffractive optical element, allowing for more optimal use of the space-bandwidth product allowed for the diffractive optical element design given the minimum feature size supportable by the particular fabrication technology chosen. It will be readily appreciated by those skilled in the art that certain applications requiring only focal power of the optical means may be satisfactorily accommodated by incorporation of GRIN (lens) elements alone. Notwithstanding this, to the best of the inventors' knowledge, the incorporation of conjoint diffractive and GRIN design features in a single micro-optical element is an additional novel feature of the present invention.

Figure 7:
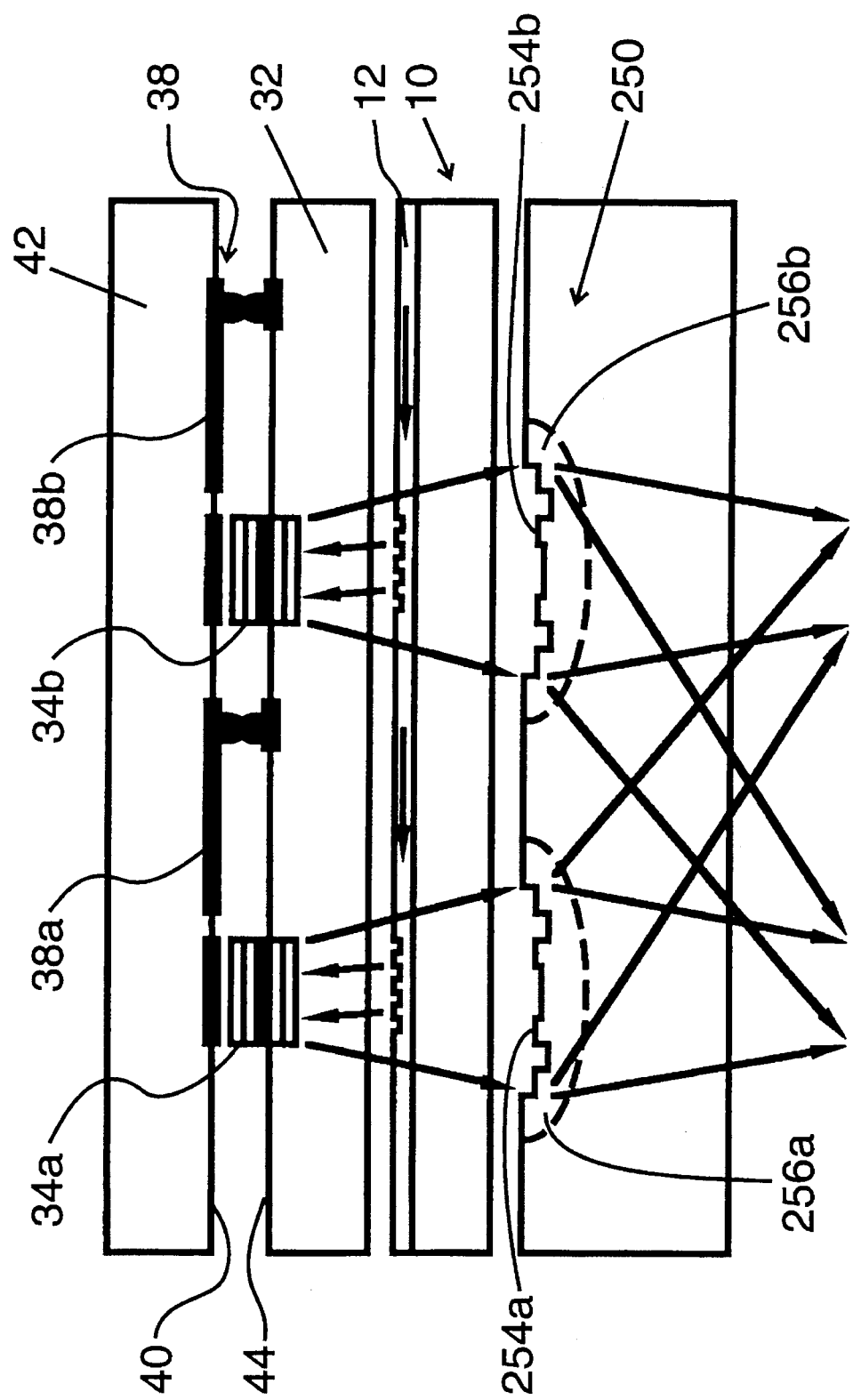
FIG. 7 is a schematic diagram of a photonic module that is a hybrid electronic/photonic computational/interconnection element, showing an optical power bus and an array of diffractive optical elements, with fanout of beams from each diffractive optical element.

FIG. 7 depicts a schematic diagram of a second possible configuration of the multilayer hybrid electronic/photonic computational/interconnection element. In contrast with the case depicted in FIG. 6 (beam focusing without beam fan-out), FIG. 7 specifically depicts one of several possible methods for accomplishing the focusing function with beam fan-out, in which the optical means 250 comprises an array of diffractive optical elements (254a and 254b) that are specifically designed to provide appropriate focal power, a variable beamsplitting function, and a beam redirection function. The beam fan-out case depicted in FIG. 7 may be used, for example, to provide a portion of the output signal from a given reflective optical modulator and its associated electronic driver to multiple output ports. Although the primary functionality of the signal fan-out process described here is more appropriate for analog signal fan-out and subsequent fan-in, as may be characteristic for a neural network or multilayer retina early vision application, for example, certain digital signal distribution applications require signal fan-out and fan-in as well.

Even more so than in the previous case (without fan-out, as depicted in FIG. 6), the incorporation of a GRIN element (e.g., 256a or 256b) can be expected to significantly relieve the design constraints on the associated diffractive optical element (DOE) for the case of beam fan-out. For example, the focal power may be entirely provided by a GRIN element designed to function as a microlens, while the beamsplitting and beam redirection functions may be entirely provided by the diffractive optical element. In general, the collocation of these two types of optical elements provides additional degrees of freedom to the design optimization problem.

Figure 8:
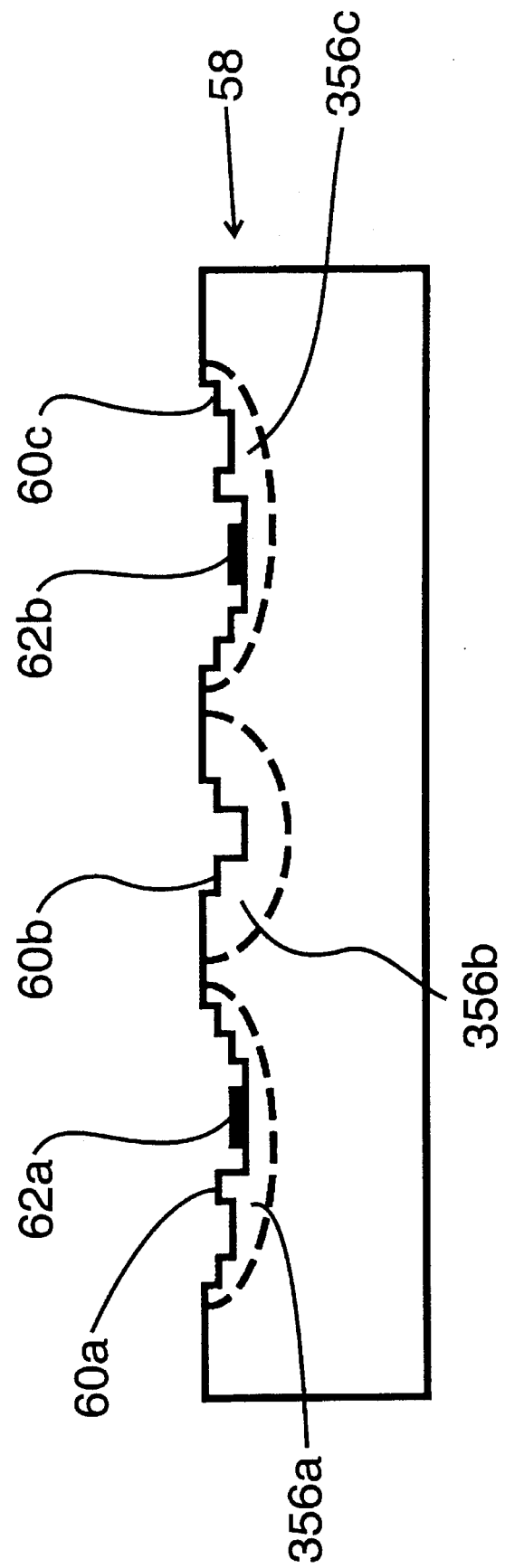
FIG. 8 is a schematic diagram of a generalized GRIN/DOE component showing an array of gradient-index regions combined with diffractive optical elements.

FIG. 8 depicts a schematic diagram of a generalized GRIN/DOE component 58 with both gradient-index element (356a, 356b, and 356c) and diffractive optical element (60a, 60b, and 60c) characteristics. As practiced by those skilled in the art, fabrication of diffractive optical elements typically involves the chemical or ion etching of two or more levels into a transparent substrate, with a computer-generated pattern designed to accomplish a particular beam-forming or beam-shaping function through diffraction of an incident beam from the phase pattern so produced on the substrate. As shown in FIG. 8, the incorporation of additional reflective and absorptive regions (62a, 62b) can further increase design flexibility by providing additional degrees of freedom. Such reflective regions may comprise, for example, single-layer or multilayer thin film coatings designed to produce a given reflectivity and/or phase shift when deposited on a given substrate. Such absorptive regions may comprise, for example, thin film metallic coatings designed to produce a given absorptivity when deposited on the substrate. To the best of the inventors' knowledge, the incorporation of specifically-designed reflective and absorptive features in a diffractive optical element is an additional novel feature of the present invention.

Figure 9:
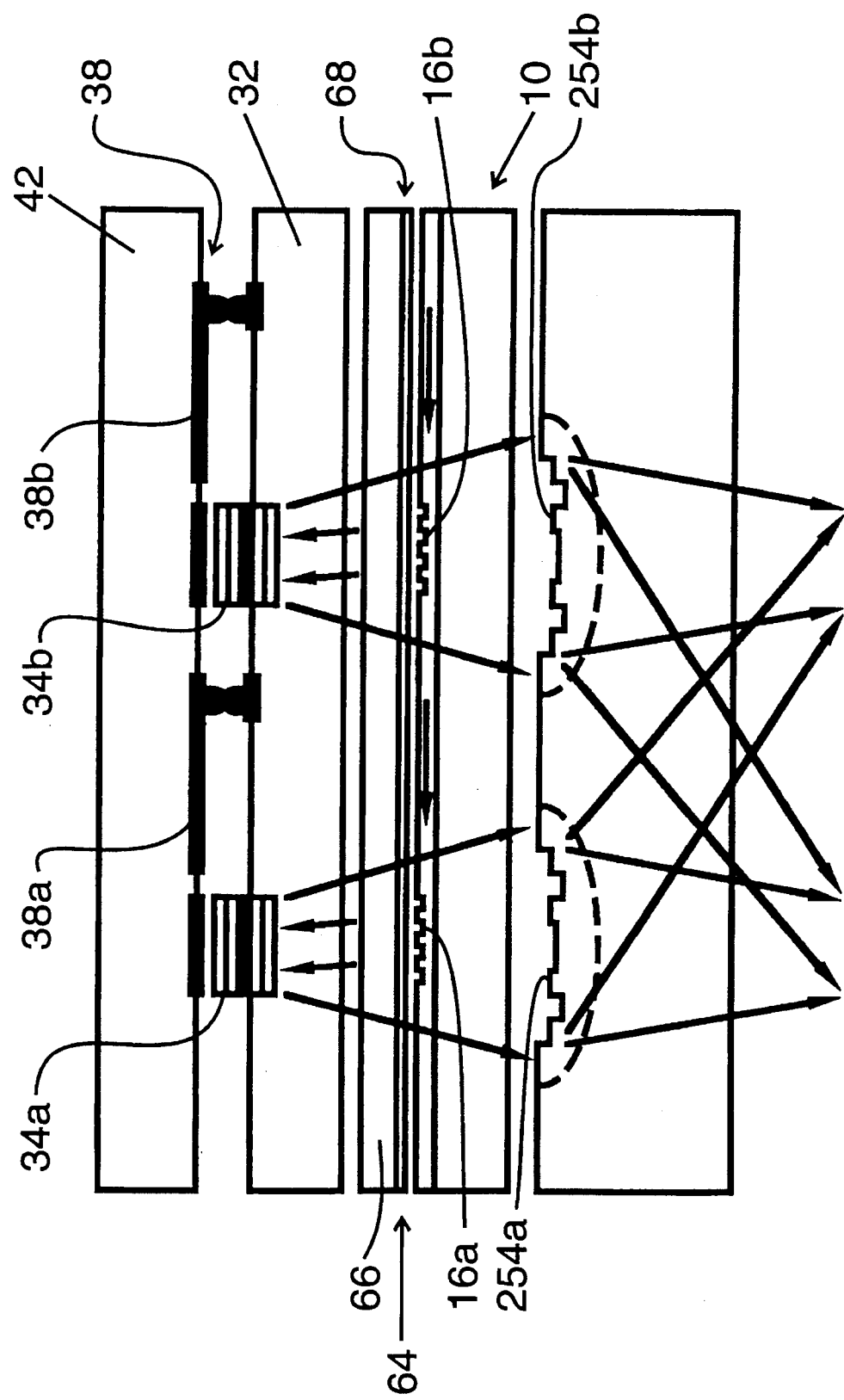
FIG. 9 is a schematic diagram of a photonic module that is a hybrid electronic/photonic computational/interconnection element, showing an optical power bus, microlens array, and diffractive optical element array.

FIG. 9 again depicts a multilayer hybrid electronic/optical interconnection element comprising an optical power bus 10, a reflective modulator array (34a and 34b), an array of corresponding electronic drive circuitry 38, and a diffractive optical element array (254a, 254b). Additionally, optical means 64 are provided for collection of the light outcoupled from each outcoupling grating 16a and 16b within the optical power bus 10, and for subsequently focusing the outcoupled light onto the corresponding (operatively-associated) reflective optical modulator (34a and 34b, respectively). For the case in which the optical power bus 10 comprises a rib waveguide array with outcoupling gratings 16a and 16b, the optical means 64 for collection and focusing may comprise, for example, a two-dimensional cylindrical microlens array, with each individual cylindrical microlens oriented along the length of a corresponding individual rib waveguide, and having a focal length determined by the thickness and refractive index of the microlens array substrate 66, and by the thickness and refractive index of the reflective modulator array substrate 32. Alternatively, the optical means 64 may comprise a two-dimensional spherical microlens array, also having a focal length determined by the thickness and refractive index of the microlens array substrate 66, and by the thickness and refractive index of the reflective modulator array substrate 32. It will be readily appreciated by those skilled in the art that the microlens arrays 68 described above may in turn comprise any combination of diffractive optical elements, holographic optical elements, gradient-index optical elements, and lens-shaped surface-relief undulations. For the case in which the optical power bus 10 comprises a space-variant holographic grating array, the optical means 64 for collection and focusing may comprise any of the above focusing elements as well. In addition, focal power can be incorporated into the space-variant holographic grating array itself to the extent allowed by the available space-bandwidth product of the holographic grating and the design constraints implied by any other functionality incorporated in this element. In any case, light diffracted upward from the optical power bus 10 passes through the microlens array 68 once before reflection from the array of reflective optical modulators 34a and 34b, and a second time after reflection. As such, incorporation of this element may alter the optimal design of the diffractive optical element array (254a and 254b) positioned below the optical power bus 10.

4. Multilayer Hybrid Electronic/Photonic Computational/Interconnection Element

The multilayer hybrid electronic/optical interconnection elements described above can be directly incorporated in envisioned multichip module integration applications that require the vertical interconnection of two or more very-large-scale integrated (VLSI) circuit chips within a vertical stack. The functional operation of such an electronic/photonic interconnection application is shown schematically in FIG. 10, in which a multilayer hybrid electronic/optical interconnection element is employed to interconnect an upper electronic chip 70 to a lower electronic chip 72 in the vertical dimension, in parallel. In this case, optical detectors (74a, 74b, 76a, 76b) are incorporated on each chip (70, 72) at the locations of data or signal input ports. Each such optical detector (74a, 74b, 76a, 76b) provides input to an optical receiver incorporated on the electronic chip (70, 72), which serves to amplify the detected signal either linearly or nonlinearly, depending on the overall architecture and functionality of the multichip module, in turn providing a conditioned signal input to additional electronic circuits (38a, 38b, 81a, and 81b) incorporated on the electronic chip (70, 72) in proximity to the optical detector (74a, 74b, 76a, 76b) and receiver.

Again with reference to FIG. 10, it can be readily appreciated that the combination of the multilayer hybrid electronic/optical interconnection element with a second electronic chip 72 containing appropriately placed and oriented detectors (76a, 76b) allows for the formation of an array of vertically-oriented interconnection or communication channels (78a, 78b). Each such interconnection or communication channel (78a, 78b) functions in the following manner. The combination of the upper (first) electronic chip 70, the reflective modulator array (34a, 34b), and the optical power bus 10 provide an array of modulatable sources (output ports) for signal transmission to associated input ports on the lower (second) electronic chip 72 at the location of each operatively-associated optical detector (76a, 76b). For the particular case of beam fan-out shown explicitly in FIG. 10, the transmission of analog signals is typical, with summation of multiple inputs (fan-in) accomplished on each given optical detector (76a, 76b). In all of the above, the wavelength of light is chosen such that the substrates (32, 14, 80, 242) are for the most part transparent to the illumination.

Figure 11:
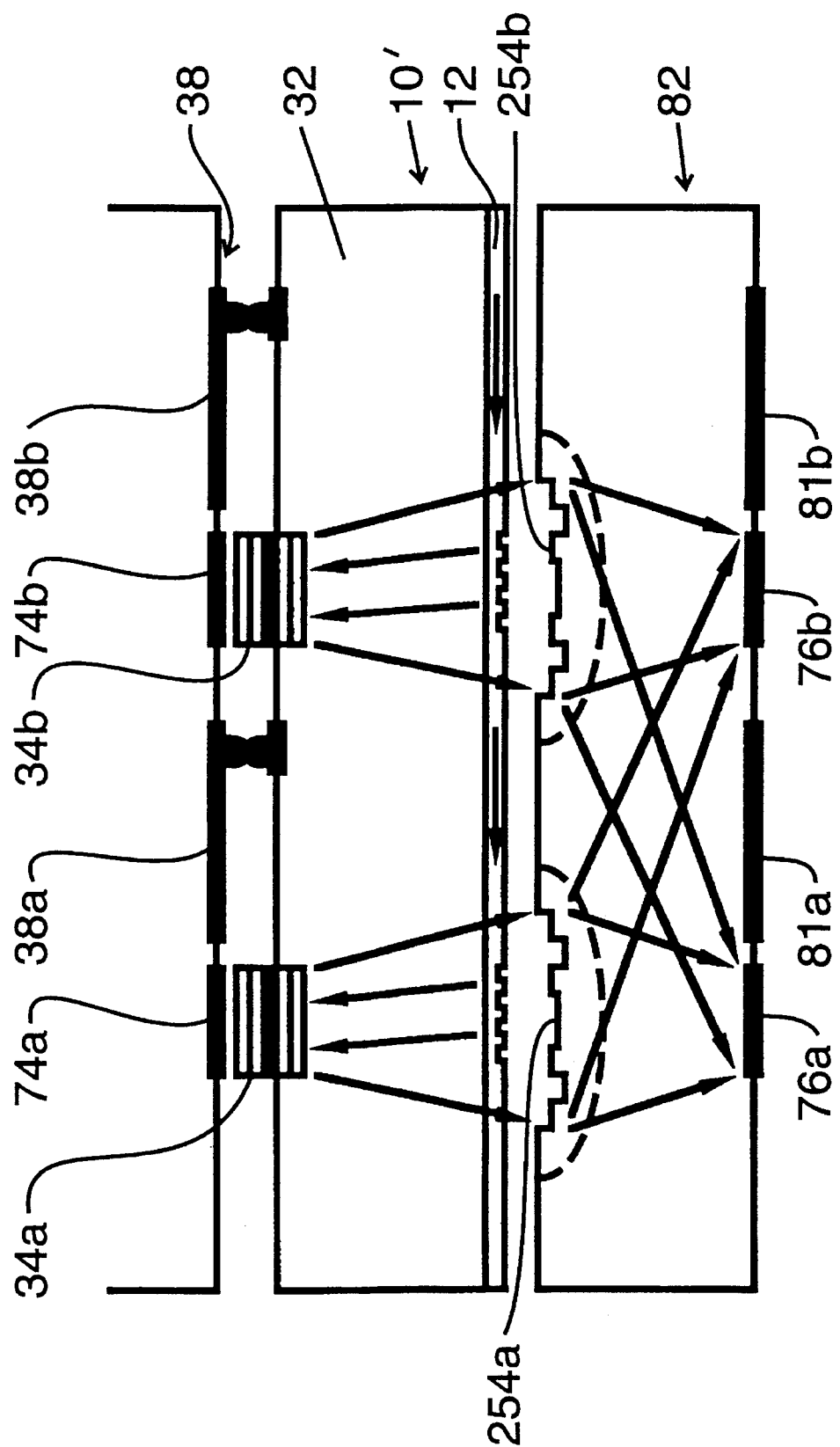
FIG. 11 is a schematic diagram of a compact photonically-interconnected multichip module that is an advanced multilayer hybrid electronic/photonic computational/interconnection element, showing two silicon electronic chips and monolithic integration of an optical power bus and of a diffractive optical element array.

FIG. 11 depicts another embodiment of the multilayer hybrid electronic/photonic computational/interconnection element, showing the monolithic integration of the optical power bus 10' on the lower side of the reflective modulator array substrate 32, and the monolithic integration of the diffractive optical element array (254a and 254b) on the upper side of the electronic chip 82, both by process-compatible two-sided electronic/photonic processing techniques. The key advantages of this embodiment over those described above include the elimination of several additional components; a potential decrease in alignment and assembly complexity, with a corresponding increase in manufacturability and decrease in manufacturing cost; and a reduction in the total thickness of each such chip-to-chip interconnection submodule. The key disadvantages of this embodiment may include a reduction in available design flexibility, a tightening of the design requirements resulting from the decrease in total optical path from the diffractive optical element array to the optical detector array, and the offsetting increase in manufacturing complexity and cost that may result from the necessity to perform two-sided as opposed to single-sided processing steps.

Figure 12:
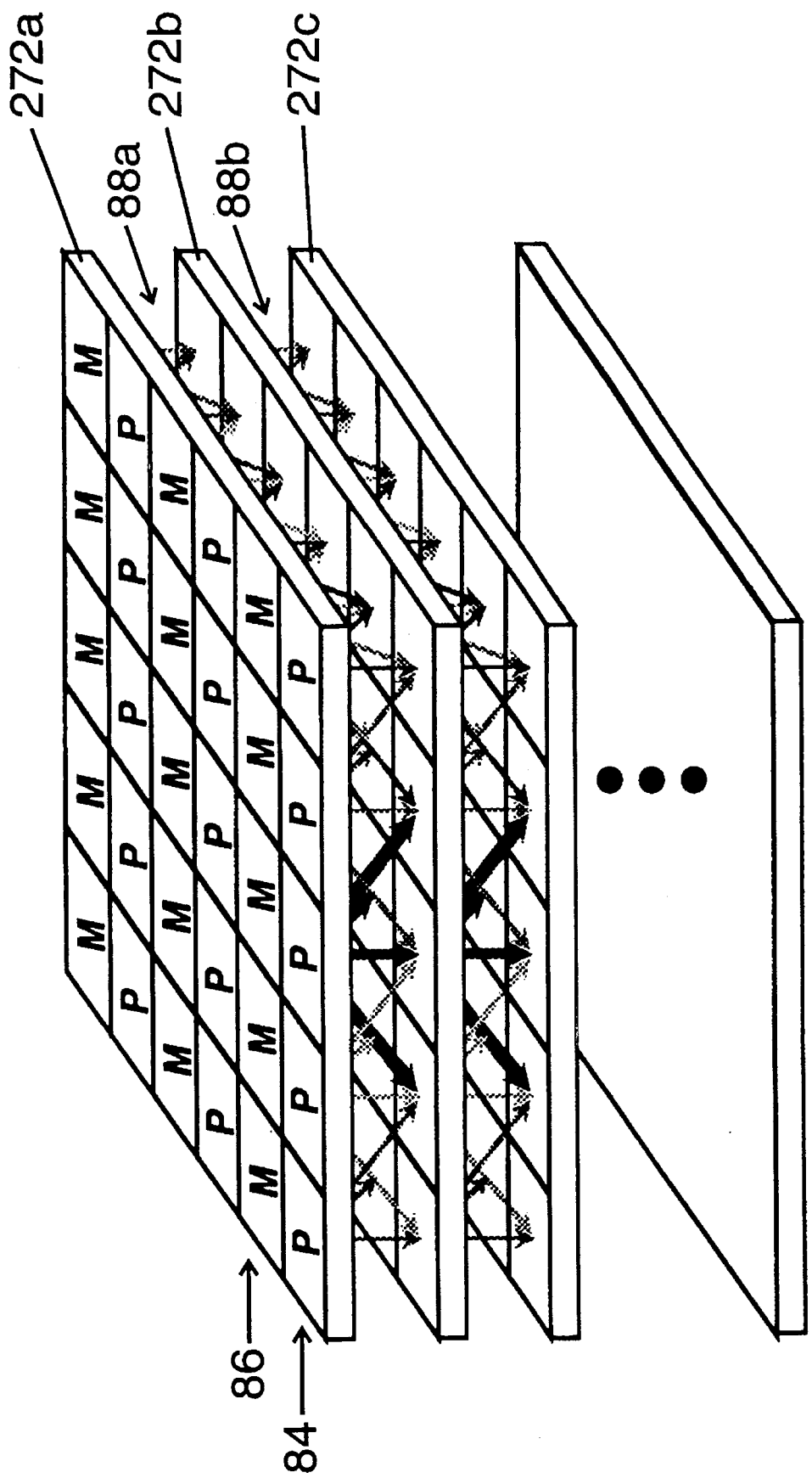
FIG. 12 is a conceptual schematic diagram of a photonic multichip module, showing multiple silicon electronic chips in a vertical 3-D stack, and parallel photonic interconnections with fanout between each pair of silicon electronic chips.

On the basis of the above discussion, it can be readily appreciated that the multichip module drawn schematically in FIG. 12 conveys the overall system integration concept, in which individual silicon (for example) VLSI electronic chips (272a, 272b, 272c, etc.) containing any of a number of possible configurations of local processing elements 84 (denoted by P's) and memory elements 86 (denoted by M's) that may be interconnected laterally within each plane by traditional electronic techniques, and vertically between each pair of electronic chips (e.g., 272a and 272b, etc.) by a combination of optical and photonic means (88a, 88b, etc.) as described above. Provision is made for local weighted or unweighted fan-out of interconnection signals to several sets of nearest neighbor input ports, next-nearest neighbor input ports, and so on depending on the particular application envisioned. Incorporation of multilayer hybrid electronic/photonic computational/interconnection elements can thus be seen to provide the key novel capability of vertical interconnection within a multichip module stack without resorting to either electrical through-substrate vias or individual high-power-consumption optical sources such as vertical-cavity surface-emitting lasers or light-emitting-diodes at each output port.

It may be easily appreciated by those skilled in the art that bidirectional signal and data communication between pairs of chips can be incorporated by including both electronic and optical modulator array chips in each vertical plane of a three-dimensional multichip module. Alternatively, monolithic integration of the electronic processing, memory, and optical modulation functions on one or more sides of a single substrate directly provides the possibility for bidirectional signal and data communication between pairs of chips.

Figure 13:
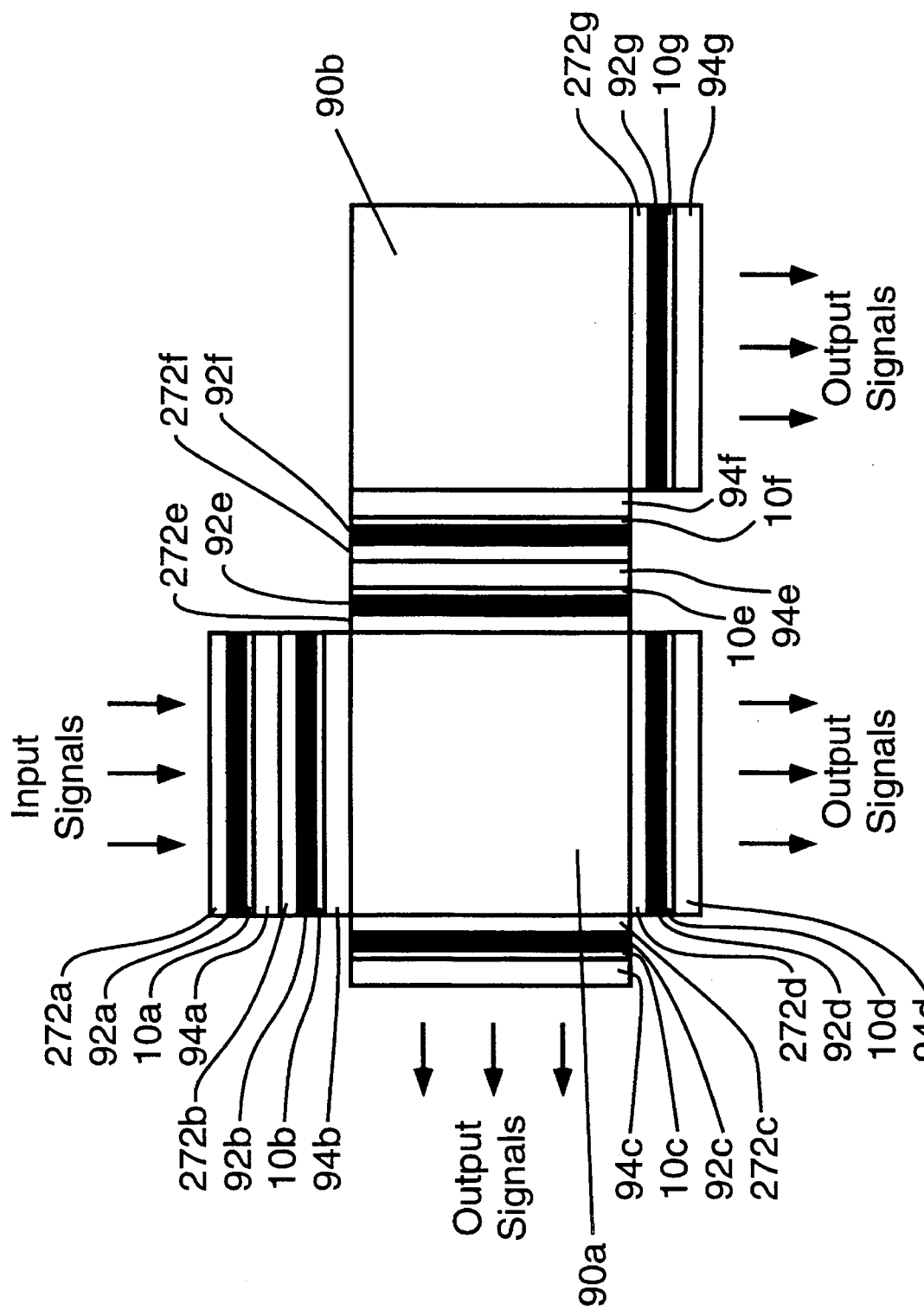
FIG. 13 is a photonic multichip module that is a densely-interconnected (locally and globally) hybrid electronic/photonic computational module, showing both diffractive optical element arrays for local interconnections and volume holographic optical elements for global interconnections.

5. Densely-Interconnected Hybrid Electronic/Photonic Computational/Interconnection Module In all of the multichip module interconnection applications described above, provision has been made for both vertical point-to-point (vertically-aligned) and local neighborhood signal and data interconnection paths. For certain applications that require a higher degree of global connectivity, as, for example, in telecommunications-based multistage switching and routing, the architecture shown schematically in FIG. 13 may be employed. In this densely-interconnected hybrid electronic/photonic computational/interconnection module, multilayer hybrid electronic/photonic computational/interconnection elements, each comprising an electronic chip (272a through 272g), a reflective optical modulator chip (92a through 92g), and optical power bus (10a through 10g), and an optical interconnection element (94a through 94g) containing a diffractive optical element array, provide for local processing and interconnection functions between pairs of operatively-associated electronic chips (e.g., 272a and 272b), while one or more volume holographic optical elements 90a and 90b provide for more global interconnections between output ports located on the reflective optical modulator chips 92b and 92f nearest to each face of the volume holographic optical element (90a and 90b), and input ports located on the electronic chips (272c, 272d, 272e, and 272g) nearest to each face of the volume holographic optical elements (90a and 90b). Extremely high computational throughputs and interconnection densities can thus be incorporated in the aggregate densely-interconnected hybrid electronic/photonic computational/interconnection module by appropriate careful design of the geometrical structures, computational architectures, and global computational algorithms of such modules.

Several implementations of the volume holographic optical elements 90a and 90b can be employed to advantage, including optically recorded and fixed bulk volume holographic optical elements, optically recorded and fixed stratified volume holographic optical elements, and computer-generated stratified volume holographic optical elements. The former two implementations are well-known to those skilled in the art, notwithstanding the fact that they have not been employed previously in the novel manner suggested by the present invention to the best of the inventors' knowledge.

Figure 14:
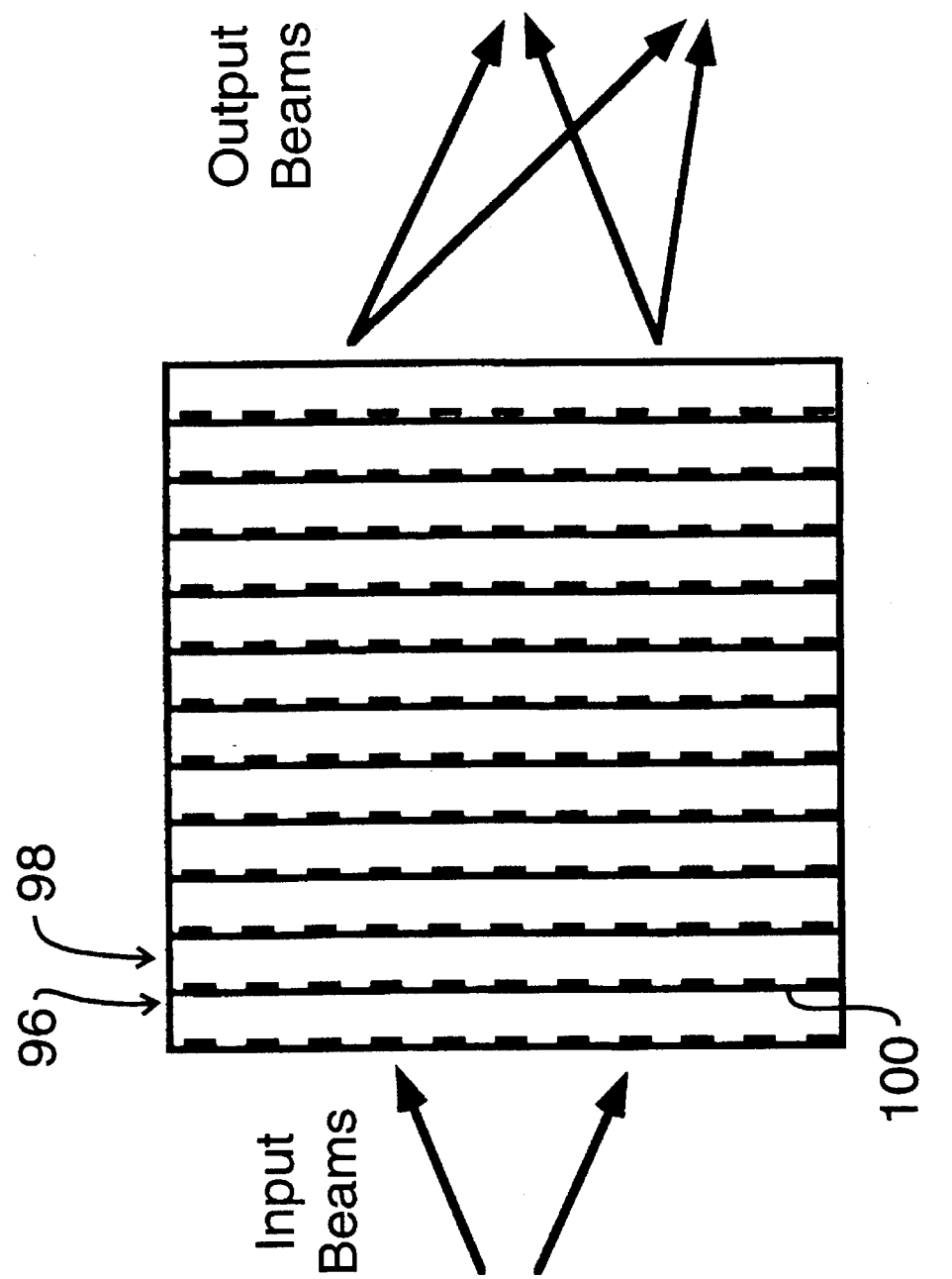
FIG. 14 is a schematic diagram of a computer-generated stratified volume holographic optical element (CG-SVHOE)

The latter implementation is described schematically in FIG. 14, which depicts such a computer-generated stratified volume holographic optical element. In this type of multilayer diffractive optical element, optical modulation layers 96 containing phase or amplitude modulation are interspersed with buffer (substrate) layers 98 containing no modulation at all, such that the process of volume diffraction can be broken down into successive stages of phase or amplitude modulation followed by pure diffraction (wave propagation). Proper choice of the buffer layer thicknesses can yield structures with novel diffractive properties, such as periodic Bragg peaks in the angular spectrum, wavelength notch filtering, and spatial frequency notch filtering. Alignment between successive stages during stratified volume holographic optical element (SVHOE) fabrication can be accomplished by mask alignment and layer fixation procedures similar to those employed in semiconductor VLSI processing. Such an SVHOE potentially provides not only for complex global interconnection patterns, but also can provide for optical beamsplitting/power distribution tasks in the same element.

The key elements of a computer-generated stratified volume holographic optical element therefore comprise a set of planar computer-generated holograms 100, which as is well-known to those skilled in the art can be fabricated by any of several different techniques including those characteristic of the fabrication of the diffractive optical elements described above. In this case, however, the individual planar computer-generated holograms 100 are designed by a collective design algorithm that implements the desired overall interconnection function by iteratively optimizing the planar computer-generated hologram 100 incorporated in each optical modulation layer 96 of a multilayer stack geometry as shown in FIG. 14. Each successive pair of planar computer-generated holograms 100 is separated by the thickness of one planar computer-generated hologram substrate 98, which thickness must be carefully accounted for in the iterative design process.

B. SENSOR SIGNAL PROCESSING, IMAGE PROCESSING, AND VISION

One important class of applications is that of sensor signal processing, which requires parallel computing tightly coupled with a fine-grained array of sensors that detect 2-D signals (perhaps in several spectral bands) from the environment. These systems may also be thought of as image processing or vision systems that emulate some of the computationally intensive front-end processing done by the neural layers behind the retina in human vision. The ultra-dense interconnection capabilities of multilayer hybrid electronic/photonic computational/interconnection elements as described above are needed to accept optical inputs at the spatial resolution required (generally 512×512, 1024×1024 or more pixels), and the ultra-fast processing capabilities of an integrated electronic processing array are needed for demanding vision algorithms.

Figure 15:
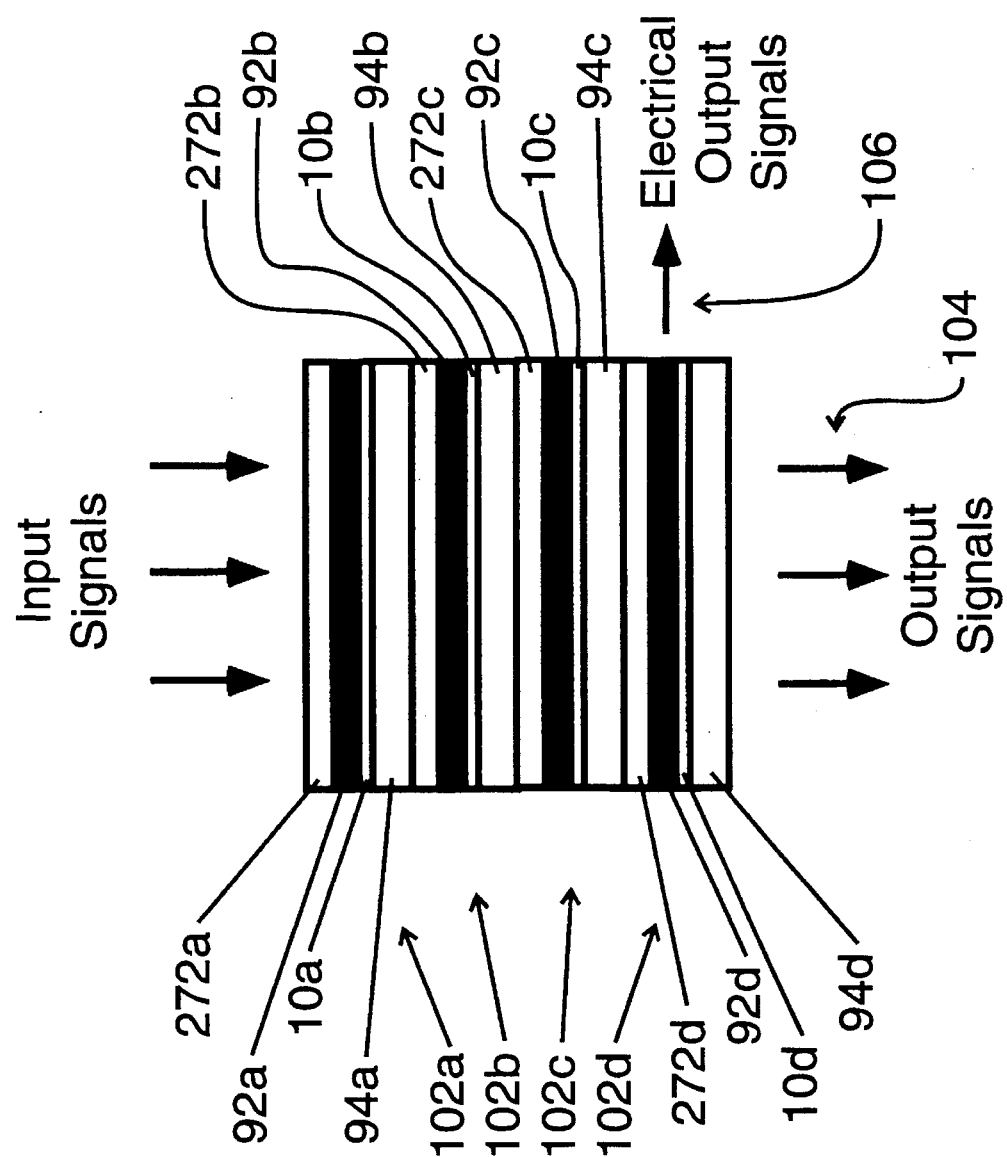
FIG. 15 is a schematic diagram of a photonic multichip module showing a set of silicon electronic chips interspersed pairwise with a modulator array chip, optical power bus, and a diffractive optical element array.

FIG. 15 depicts one possible embodiment of the present invention as applied to sensor signal processing, image processing, and vision, in which a multilayer stack of multilayer hybrid electronic/photonic computational/interconnection elements (102a through 102d) incorporate pix-elated detection and processing means within each element of the multilayer stack. Individual functionalities may be incorporated within each successive element of the stack, including, for example, edge detection, motion detection, bright point detection (center-on, off-surround), and dark point detection (center-off, on-surround). Output signal modalities may include parallel optical outputs 104 and serial electrical outputs 106.

C. ULTRA-DENSE, ULTRA-PARALLEL COMPUTATIONAL MODULES BASED ON DISTRIBUTED AND SHARED MEMORY ARCHITECTURES

High speed, massively parallel interconnection networks are required to interconnect multiple processors with a shared memory in a number of important parallel processor architectures. In a generic architecture for these kinds of systems, a bidirectional, reconfigurable interconnection network establishes links between an array of N processors (denoted by P) and N memories (denoted by M). The array may contain 512, 1024, or more processors, and data rates exceeding 1 Gb/s may be required on each of the bidirectional lines. These systems are used in a class of applications called "grand challenge" problems such as computational fluid dynamics, real-time visualization, remote sensing, geographic data base systems, chemical dynamics simulation, and 3-D graphics rendering. At present, electronic processors are adequate for such computational tasks, and the memories may be either electronic or optoelectronic. The real bottleneck is the interconnection network. Only optical networks have the capability to transfer data at speeds exceeding a gigabit per second over the very large number of parallel interconnection channels required for such problems.

Many types of optical networks have been envisioned for this application, including crossbars, shuffle-exchange (omega networks), Clos-Benes networks, banyan networks, and crossover networks. Similar networks have been developed for switching applications in telecommunications. Many different experimental interconnection networks have been built to test these ideas using various optoelectronic devices. Their demonstrated performance to date has shown that optoelectronic networks have adequate speed and fanout capabilities to be useful in such parallel processing systems. These systems have thus far been built with discrete components.

Figure 10:
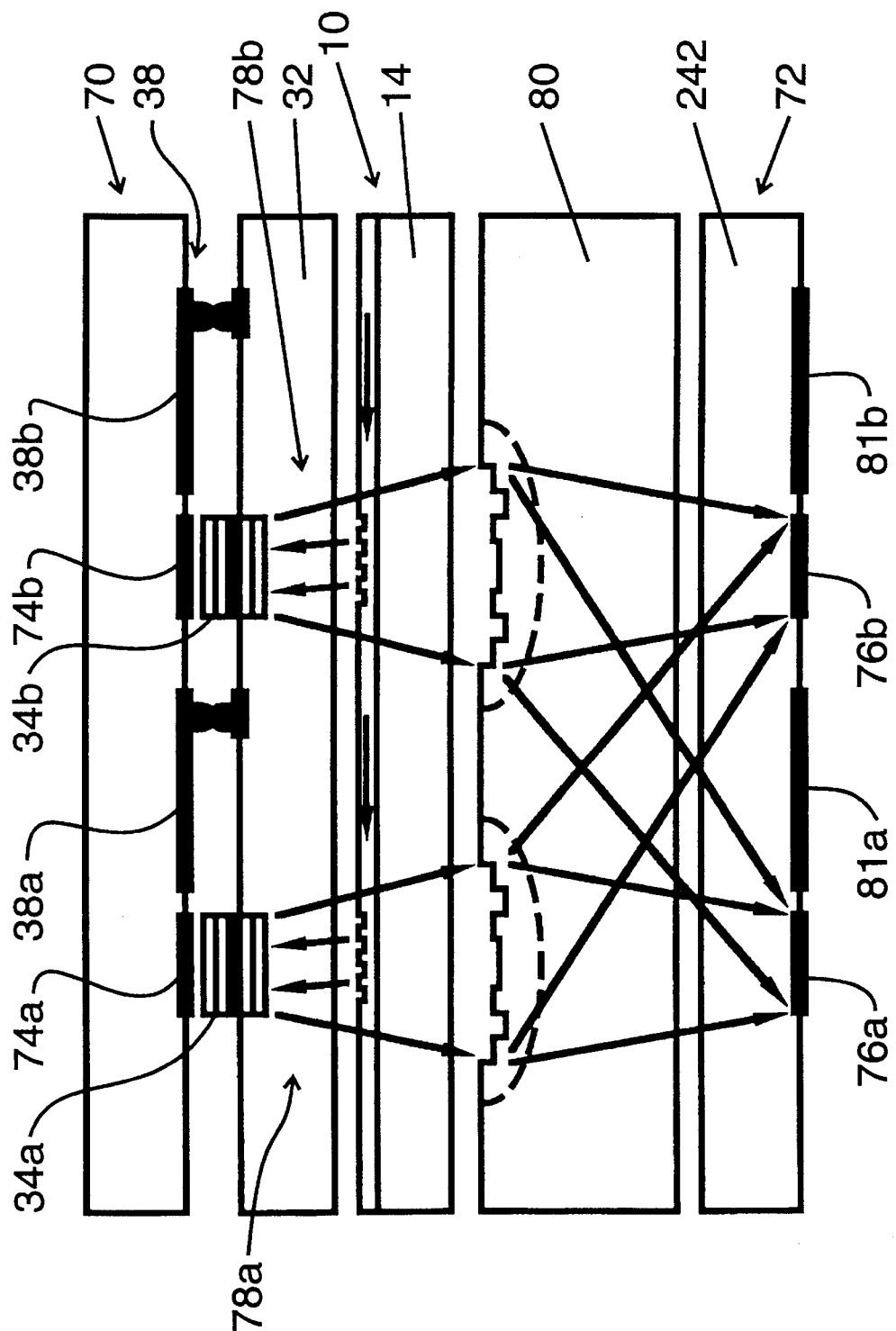
FIG. 10 is a schematic diagram of a photonically-interconnected multichip module that is a multilayer hybrid electronic/photonic computational/interconnection element, showing two silicon electronic chips, a GaAs modulator array chip, an optical power bus, and a diffractive optical element array.

Significant advantages may accrue to the implementation of high performance systems using the multichip module integration technology described in the teachings of the present invention. Some of the networks may require several cascaded stages using only local interconnections as shown in FIG. 10 and FIG. 15. Others may require the addition of global interconnections using the volume holographic optical elements of FIG. 13.

D. MULTIDIMENSIONAL DISPLAYS AND DISPLAY DRIVERS

Again with reference to FIG. 9, it can be appreciated that utilization of the multilayer hybrid electronic/photonic computational/interconnection element as shown, without the addition of a second electronic chip, provides the capability for a high-bandwidth display at the wavelength chosen for the interconnection. For example, a high-bandwidth near-infrared display can be implemented by using a wavelength of 0.98 micrometers, which is compatible with an array of reflective optical modulators comprising multiple quantum well modulators fabricated in the $In_xGa_{1-x}As/GaAs$ and/or $In_xGa_{1-x}As/Al_yGa_{1-y}As$ ternary compound semiconductor systems.

Further, FIGS. 3, 4, and 6 also can provide real-time display capability, and the wavelength(s) of display depend on the modulation mechanisms and substrate materials employed. For example, the use of liquid crystal reflection or transmission modulators in conjunction with substrate materials transparent in the visible allow for a visible-wavelength display. The incorporation of an array of diffractive or refractive optical elements, as in FIG. 6, allows for additional functionality or design freedom over the systems of FIGS. 3 and 4, for example in order to provide the desired pixel fill factor (e.g., 100%) at the plane of the displayed images, even when the modulator array exhibits a different fill factor.

E. COMPUTER ANIMATION AND GRAPHICS

Again with reference to FIG. 12, it will be readily appreciated by those skilled in the art that highly regular arrays of processors and associated memories integrated with dense lateral and vertical interconnections are well suited for computationally parallelizable applications such as computationally-intensive rendering engines in computer animation and graphics.

F. TELECOMMUNICATIONS

Referring once again to FIG. 6, it will be readily apparent to those skilled in the art that the output beams 108 emitted from the diffractive optical element array (54a and 54b) can be used to provide inputs to an appropriately arrayed set of optical fibers, set on the same lateral spacing as that of the reflective optical modulators (34a and 34b), and operatively associated with the reflective optical modulators (34a and 34b) on a one-to-one basis. In this particular application, the diffractive optical element array (54a and 54b) must be carefully designed to provide focal spot sizes and mode shapes that mode match to the desired propagation modes of the type of optical fiber employed. For typical single mode optical fibers, the mode is essentially Gaussian in shape with a beam width of about 4 to 6 micrometers as determined primarily by the diameter of the fiber core. For typical multimode optical fibers, the number of propagating modes within the numerical aperture of the fiber is much larger, as a consequence of a much larger mode (fiber core) diameter.

INDUSTRIAL APPLICABILITY

The present invention is expected to find use in electronic/photonic packaging, multichip module integration, sensor signal processors, digital computers, parallel-access 3-D memory, highly parallel rendering engines for computer animation and graphics, high resolution two-dimensional and three-dimensional display drivers, high bandwidth image displays, smart cameras, artificial multilayer retinas, early vision systems, and neural networks.

Thus, there has been disclosed apparatus and architectures for modulator-based photonic chip-to-chip interconnections for dense three-dimensional multichip module integration. It will be readily apparent to those skilled in this art that various changes and modifications of an obvious nature may be made, and all such changes and modifications are considered to fall within the scope of the present invention.

What is claimed is:

1. A modulator array with compact parallel optical readout, comprising:
   (a) a first array of optical modulators;
   (b) a first optical power bus means for optical readout of said first array of optical modulators, located in close physical proximity to said first array of optical modulators, said first optical power bus means comprising:
      (i) a first at least one optical waveguide on a surface of a first substrate, said surface of said first substrate defining a first plane; and
      (ii) a first means for coupling light out of said first at least one optical waveguide into a first at least one outcoupled beam, said first at least one outcoupled beam propagating at a first nonzero angle with respect to said first plane defined by said surface of said first substrate; and
   (c) a first optics means for directing said first at least one outcoupled beam towards at least one optical modulator of said first array of optical modulators, generating a set of modulator readout beams.

2. The modulator array with compact parallel optical readout of claim 1 in which each modulator of said first array of optical modulators operates in reflection.

3. The modulator array with compact parallel optical readout of claim 2 in which said set of modulator readout beams reflects off of at least a portion of said first array of optical modulators and passes back through said first optical power bus means.

4. The modulator array with compact parallel optical readout of claim 1 in which each modulator of said first array of optical modulators operates in transmission.

5. The modulator array with compact parallel optical readout of claim 1 in which said first means for coupling light out of said at least one optical waveguide comprises at least one of diffraction, reflection, refraction, scattering, and evanescent wave coupling.

6. A combination comprising said modulator array with compact parallel optical readout of claim 1 together with an array of diffractive optical elements, each diffractive optical element of said array of diffractive optical elements operatively associated with at least one optical modulator of said first array of optical modulators.

7. The combination of claim 6 in which each diffractive optical element of at least a portion of said array of diffractive optical elements provides means for optical beam fanout, and optionally provides a design-specified diffraction efficiency to each fanned out beam resulting from said optical beam fanout.

8. A combination comprising said modulator array with compact parallel optical readout of claim 1 together with an array of microlenses, each microlens of said array of microlenses operatively associated with at least one optical modulator of said first array of optical modulators.

9. The combination of claim 8 in which each microlens of said array of microlenses comprises one of a refractive lens, a diffractive lens, or a combined refractive/diffractive lens.

10. A combination comprising said modulator array with compact parallel optical readout of claim 1 together with an array of optical detectors, each optical detector of said array of optical detectors operatively associated with at least one optical modulator of said first array of optical modulators.

11. A combination comprising said modulator array with compact parallel optical readout of claim 1 together with an array of optical fibers, each optical fiber of said array of optical fibers operatively associated with at least one optical modulator of said first array of optical modulators.

12. A combination comprising said modulator array with compact parallel optical readout of claim 1 together with a silicon electronic chip, said silicon electronic chip operatively associated with said first array of optical modulators.

13. The combination of claim 12 in which said silicon electronic chip is flip-chip bonded to said first array of optical modulators.

14. The combination of claim 12 in which said silicon electronic chip further comprises a set of optical detectors.

15. A combination comprising said modulator array with compact parallel optical readout of claim 1 together with a volume holographic element, said volume holographic element operatively associated with said first array of optical modulators.

16. The combination of claim 15 in which said volume holographic element comprises a stratified volume holographic optical element.

17. A combination comprising said modulator array with compact parallel optical readout of claim 1 together with a computer-generated stratified volume holographic optical element, said computer-generated stratified volume holographic optical element operatively associated with said first array of optical modulators.

18. A combination comprising said modulator array with compact parallel optical readout of claim 1 together with:
   (a) at least one set of optical detectors, each detector of said at least one set of optical detectors operatively associated with at least one optical modulator of said first array of optical modulators; and
   (b) a second modulator array with compact parallel optical readout, said second modulator array with compact parallel optical readout comprising:

(i) a second array of optical modulators, each optical modulator of said second array of optical modulators operatively associated with at least one optical detector of said at least one set of optical detectors;

(ii) a second optical power bus means for optical readout of said second array of optical modulators, located in close physical proximity to said second array of optical modulators, said second optical power bus means comprising:

(1) a second at least one optical waveguide on a surface of a second substrate, said surface of said second substrate defining a second plane; and (2) a second means for coupling light out of said second at least one optical waveguide into a second at least one outcoupled beam, said second at least one outcoupled beam propagating at a second nonzero angle with respect to said second plane defined by said surface of said second substrate; and (iii) a second optics means for directing said second at least one outcoupled beam towards at least one optical modulator of said second array of optical modulators.

19. A photonically-interconnected multichip module comprising:

(a) a first electronic chip comprising:
(i) a first silicon substrate with two sides, a face and a back side;
(ii) a first set of integrated detectors on said face; and
(iii) a first set of integrated electronics on said face;

(b) a GaAs chip comprising:
(i) an intrinsic GaAs substrate having two sides, a face and a back side; and
(ii) an array of optical $In_xGa_{1-x}As/GaAs$ inverted cavity multiple quantum well reflective modulators on said face of said intrinsic GaAs substrate, with $0.10<x<0.25$, and with a design wavelength of operation of approximately 980 nm;

said GaAs chip flip-chip bonded to said first silicon chip, said face of said first silicon substrate bonded to said face of said intrinsic GaAs substrate by means of an array of indium bump bonds;

(c) a microlens array element, comprising:
(i) a microlens array substrate having two sides, a face and a back side; and (ii) an array of microlenses, at least partially on said face of said microlens array element;

said back side of said microlens array substrate bonded to said back side of said intrinsic GaAs substrate;

(d) an optical power bus, comprising:
(i) a $LiNbO_3$ substrate having two sides, a face and a back side;
(ii) an array of $LiNbO_3$ rib waveguides on said face of said $LiNbO_3$ substrate; and
(iii) a one-dimensional array of diffractive outcoupling gratings on each rib waveguide of said array of rib waveguides, each diffractive outcoupling grating of said one-dimensional array of outcoupling gratings in alignment with each said optical InGaAs/GaAs inverted cavity multiple quantum well reflective modulator of said array of optical InGaAs/GaAs inverted cavity multiple quantum well reflective modulators;

said face of said $LiNbO_3$ substrate bonded to said face of said microlens array substrate;

(e) an optical interconnection element, comprising:
(i) an optical interconnection element substrate having two sides, a face and a back side;
(ii) an array of diffractive optical elements, each diffractive optical element of said array of diffractive optical elements comprising a patterned discrete-level surface relief etched into said face of said optical interconnection element substrate; and
(iii) an optional array of gradient index lenses, each gradient index lens of said optional array of gradient index lenses centered in the lateral dimensions around each said diffractive optical element;

said face of said optical interconnection element substrate bonded to said back side of said optical power bus;

(f) a second electronic chip comprising:
(i) a second silicon substrate with two sides, a face and a back side;
(ii) a second set of integrated detectors on said face of said second electronic chip; and
(iii) a second set of integrated electronics on said face of said second electronic chip;

said back side of said second silicon substrate bonded to said back side of said optical interconnection element substrate.

* * * * *